(12) United States Patent
Puskas et al.

(10) Patent No.: US 8,883,912 B2
(45) Date of Patent: Nov. 11, 2014

(54) SYNTHESIS OF ARBORESCENT POLYMERS VIA CONTROLLED INIMER-TYPE REVERSIBLE ADDITION-FRAGMENTATION CHAIN TRANSFER (RAFT) POLYMERIZATION

(75) Inventors: Judit Eva Puskas, Akron, OH (US); Andrew John Heidenreich, Akron, OH (US)

(73) Assignee: University of Akron, Akron, OH (US)

( * ) Notice: Subject to any disclaimer, the term of this patent is extended or adjusted under 35 U.S.C. 154(b) by 710 days.

(21) Appl. No.: 13/058,570

(22) PCT Filed: Aug. 11, 2009

(86) PCT No.: PCT/US2009/053395
§ 371 (c)(1),
(2), (4) Date: Feb. 22, 2011

(87) PCT Pub. No.: WO2010/019563
PCT Pub. Date: Feb. 18, 2010

(65) Prior Publication Data
US 2011/0144268 A1    Jun. 16, 2011

Related U.S. Application Data

(60) Provisional application No. 61/188,618, filed on Aug. 11, 2008.

(51) Int. Cl.
*C08F 228/02*    (2006.01)
*C08F 20/18*    (2006.01)
(Continued)

(52) U.S. Cl.
CPC ... *C08F 2/38* (2013.01); *C08F 4/28* (2013.01); *C08F 4/04* (2013.01); *C08L 51/003* (2013.01); *C08L 53/005* (2013.01); *C08G 83/002* (2013.01); *C08F 2220/1825* (2013.01); *C08F 293/005* (2013.01); *C08L 53/00* (2013.01); *C08F 212/08* (2013.01); *C08F 2438/03* (2013.01); *C08F 12/32* (2013.01); *C08F 12/30* (2013.01)
USPC ........................................................ 524/543

(58) Field of Classification Search
CPC .......... C08F 2/38; C08F 4/04; C08F 293/005; C08F 212/08; C08F 12/32; C08F 12/30; C08F 4/28; C08F 8/12; C08F 2438/03; C08F 2220/1825; C08F 212/32; C08L 53/005; C08L 53/00; C08L 51/003; C08L 2666/02; C08G 83/002
USPC ........................................................ 524/543
See application file for complete search history.

(56) References Cited

U.S. PATENT DOCUMENTS

2003/0050411 A1    3/2003  Gaynor et al.
2003/0191262 A1*  10/2003  McCormick et al. ......... 526/288
(Continued)

FOREIGN PATENT DOCUMENTS

WO    WO 98/01478    1/1998
WO    WO 2008/027589    3/2008

OTHER PUBLICATIONS

Chiefari, et al. "Living Free-Radical Polymerization by Reversible Addition-Fragmentation Chain Transfer: The RAFT Process," Macromolecules 1998, 31, 5559-5562.

(Continued)

*Primary Examiner* — Angela C Scott
(74) *Attorney, Agent, or Firm* — Renner, Kenner, Greive, Bobak, Taylor & Weber

(57) ABSTRACT

Randomly branched polymers, such as homopolymers, copolymers, block copolymers and functionalized polymers are disclosed which may be formed by polymerizing a polymerizable monomer, such as styrene with a dithioester chain transfer agent which includes a polymerizable group. The reaction may be performed in one pot. The randomly branched polymer can have high molecular weight and broad molecular weight distribution.

29 Claims, 15 Drawing Sheets

(51) Int. Cl.

| | |
|---|---|
| *C08F 36/08* | (2006.01) |
| *C08F 12/12* | (2006.01) |
| *C08F 4/04* | (2006.01) |
| *C08F 293/00* | (2006.01) |
| *C08F 2/38* | (2006.01) |
| *C08L 41/00* | (2006.01) |
| *C08F 4/28* | (2006.01) |
| *C08L 51/00* | (2006.01) |
| *C08L 53/00* | (2006.01) |
| *C08G 83/00* | (2006.01) |
| *C08F 212/08* | (2006.01) |
| *C08F 12/32* | (2006.01) |
| *C08F 12/30* | (2006.01) |
| *C08F 220/18* | (2006.01) |

(56) References Cited

U.S. PATENT DOCUMENTS

| | | | |
|---|---|---|---|
| 2003/0195310 A1* | 10/2003 | McCormick et al. | 526/193 |
| 2004/0171777 A1 | 9/2004 | Le et al. | |
| 2004/0248039 A1* | 12/2004 | Sounik et al. | 430/281.1 |
| 2006/0111531 A1* | 5/2006 | McCormick et al. | 526/303.1 |
| 2006/0111532 A1* | 5/2006 | McCormick et al. | 526/303.1 |
| 2007/0123670 A1* | 5/2007 | McCormick et al. | 526/222 |
| 2007/0299221 A1 | 12/2007 | Perrier | |

OTHER PUBLICATIONS

Barner-Kowollik, et al. "Mechanism and kinetics of dithiobenzoate-mediated RAFT polymerization. I. The current situation," J Polym Sci Part A: Polym Chem 2006, 44, 5809-5831.

* cited by examiner

SYNTHESIS OF ARBORESCENT POLYMERS VIA CONTROLLED INIMER-TYPE REVERSIBLE ADDITION-FRAGMENTATION CHAIN TRANSFER (RAFT) POLYMERIZATION

This invention was made with Government support under Grant No. CHE-0616834, awarded by the National Science Foundation.

BACKGROUND OF THE DISCLOSURE

The exemplary embodiment relates to free radical polymerization. It finds particular application in the synthesis of arborescent polymers and copolymers via RAFT polymerization and compositions comprising them. The polymer finds application in synthetic rubber compositions. However, it is to be appreciated that the present exemplary embodiment is also amendable to other like applications.

Arborescent (randomly branched) polymers have a cascade-type structure in which the polymer chains are branched. Such polymers have been synthesized using an anionic grafting method (See, for example, Gauthier, M., et al., *Macromolecules*, 24, 4548-4553, 1991). This method involves the separate synthesis of narrow molecular weight distribution polymers by anionic polymerization, followed by several subsequent grafting reactions to yield higher degrees of branching. The method does not lend itself to industrial processing due to stringent conditions and separate subsequent reaction steps used to build the arborescent polymer. The resulting arborescent or polymers also have a narrow molecular weight distribution which does not necessarily yield optimum physical properties.

Arborescent polyisobutylene (arb-PIB) of high molecular weight has been synthesized by inimer (initiator-monomer)-type living carbocationic polymerization of 4-(2-methoxyisopropyl) styrene and 4-(1,2-epoxisopropyl) styrene inimers. Subsequent development and study of these materials has resulted in the creation of arborescent block copolymer thermoplastic elastomers (TPEs) such as arb-PIB-b-PSt, arb-PIB-b-PpMeSt and others. These TPEs have shown to have a superior combination of properties compared to their linear tri-block counterparts. Additionally, these materials can be readily formed by one-pot synthesis.

Rizzardo, et al. report attempts to use vinylbenzyl dithiobenzoate (a mixture of meta and para isomers) in the synthesis of poly(methylmethacrylate-graft-styrene) (WO98/01478). The vinylbenzyl dithiobenzoate was co-polymerized with methylmethacrylate using azobisisobutyronitrile (AIBN) as the free-radical initiator at 60° C. The resulting poly(vinylbenzyl dithiobenzoate-co-methylmethacrylate) was used as a chain transfer agent in mediating the bulk polymerization of styrene. However, the authors report that the reaction resulted in a gel material.

Reversible addition-fragmentation chain transfer (RAFT) is a type of controlled free-radical polymerization (CFRP). The mechanism of RAFT is understood to rely on degenerative chain transfer through the dithioester functionality of the chain transfer agent (CTA) to produce polymers of narrow molecular weight distribution (MWD) and is thus a versatile type of CFRP. This mechanism is applicable to a wide range of monomers, solvents, and temperatures. Polymerizations have successfully been carried out in bulk, solution, emulsion or suspension to produce linear, graft, block, and star (co) polymers. However, there are several disadvantages with RAFT polymerization. The dithioester chain transfer agent has a pungent odor, which makes it undesirable to work with, and the resulting polymers are colored due to the incorporation of the CTA.

The synthesis of polystyrenes by RAFT polymerization has been reported. (See, Yang, Z., et al., *Macromolecules*, 36, 7446-7452, 2003, hereinafter, Yang, et al.). In this work, benzyl-4-vinyldithiobenzoate was used as a chain transfer monomer (CTM). The authors report the formation of polystyrene of branched structure with the dithioester bond located at every branching point. The branches were cleaved by an aminolysis reaction for branching analysis, yielding nearly monodisperse linear polystyrene chains. This suggests that, rather than random branching, the polymerization resulted in polystyrene stars with arms emanating from poly (benzyl-4-vinyldithiobenzoate) cores. Moreover, the placement of the dithioester bond at the branch points can be expected to impart an undesirable color and odor to the polymer.

There remains a need for a method for synthesis of randomly branched polymers, suited for bulk industrial manufacturing, which can have high molecular weight and broad molecular weight distribution.

BRIEF DESCRIPTION OF THE DISCLOSURE

In accordance with one aspect of the exemplary embodiment, a method of forming a randomly branched polymer includes polymerizing a monomer in the presence of a dithioester chain transfer agent having the general structure:

Structure 1 where R is a free-radical forming leaving group that initiates free radical polymerization of the monomer and Z is a stabilizing group which stabilizes a radical formed from the dithioester, whereby fewer branches of the randomly branched polymer are formed through a dithioester radical than through the free radical formed from R.

In various aspects, Z may be selected from an aromatic hydrocarbon group and a heterocyclic group and their substituted derivatives, and combinations thereof. R may be selected from the following optionally substituted groups: alkyl, a saturated, unsaturated, or aromatic carbocyclic or heterocyclic ring, an alkylthio, alkoxy, dialkylamino, an organometallic species, and a polymer chain prepared by any polymerization mechanism, and combinations thereof.

In accordance with another aspect, a randomly branched polymer is provided. The randomly branched polymer includes at least one repeating monomer unit derived from an alpha-beta unsaturated monomer. The polymer has a molecular weight distribution of at least 1.5.

In various aspects, the randomly branched polymer may have a weight average molecular weight of at least 0.5 kg/mole and in some embodiments, at least 3 kg/mole.

In another aspect, at least some of the branches are linked through a para-substituted vinyl benzyl monomer. The para-substituted vinyl benzyl monomer may constitute less than 5 mol % of the monomer units which make up the polymer.

In accordance with another aspect, a randomly branched polymer is provided. The randomly branched polymer is formed by a process which includes combining a monomer with a dithioester chain transfer agent. The randomly branched polymer has a molecular weight of at least 0.5 kg/mole, and a molecular weight distribution of at least 1.5.

DETAILED DESCRIPTION OF THE DISCLOSURE

Figure 1:
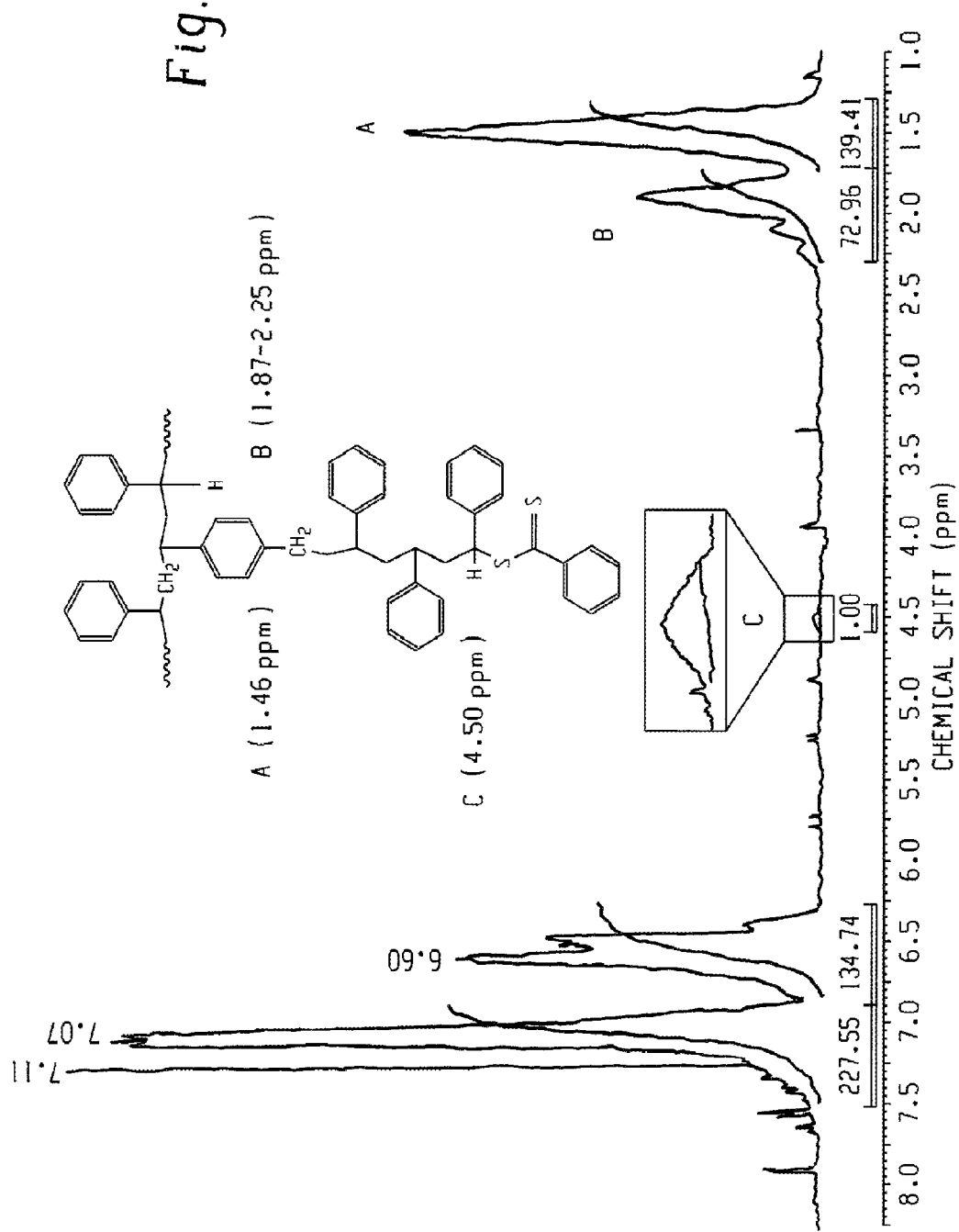
FIG. 1 is an $^1$H NMR spectra of an arborescent polymer (Sample ID 13) in accordance with the exemplary embodiment including a representative fragment of the expected branching point structure.

Aspects of the exemplary embodiment relate to randomly branched polymers and to a method of synthesis. As used herein the word polymer refers to homopolymers formed from a single monomer as well as copolymers formed from more than one monomer, block copolymers, and functionalized polymers. The randomly branched polymers are formed by a reversible addition-fragmentation chain transfer (RAFT) polymerization of a monomer using a dithioester chain transfer agent (RAFT agent) and optionally an initiator. With this method, the randomly branched polymer can have high molecular weight and broad molecular weight distribution. It can, therefore, find particular ease of industrial processing in bulk. It may find particular application as an additive in rubber compositions and other like applications.

As used herein, a polymerizable monomer can be any monomer capable of being polymerized, including dimers and oligomers of from about 2-5 repeat units and combinations thereof.

A "monomer unit" is an optionally repeating unit of a polymer which is derived from a monomer or chain transfer agent.

A "polymer," as used herein, can be a homopolymer or copolymer, block copolymer, or functionalized polymer, and in the case of a copolymer may include monomer units from multiple monomers. The resulting randomly branched polymer which is formed by the exemplary method described herein can comprise at least 50 monomer units, the majority of which may be derived from an alpha-beta unsaturated monomer, such as styrene.

In comparison to previously reported syntheses of branched polystyrene structures using reversible addition-fragmentation chain transfer (RAFT), the randomly branched polymers disclosed herein have several advantages. The methodology is general forming a randomly branched styrene polymer combining a monomer with a dithioester chain transfer agent. However, in aspects of the exemplary method radicals are selected with similar reactivity in the system. This is achieved by careful selection of a combination of the RAFT agent, the monomer, and if necessary, the initiator. This allows for any undesirable smelling dithioester moiety from the chain transfer agent to form at the terminal ends of branches of the polymer rather than at a branching point making subsequent removal via cleavage possible. Additional advantages are that the randomly branched polymers can be produced having high molecular weights and broad distributions in a one-pot synthesis. This makes for easier and less expensive bulk industrial processing.

In one embodiment, a method of forming a randomly branched polymer includes combining a monomer with a dithioester chain transfer agent (CTA) (which may be referred to herein as an inimer) having the general structure represented by Structure 1:

Structure 1

wherein the functional group R is a free-radical forming leaving group that initiates free radical polymerization of the monomer. Z is a stabilizing group, different from R, which stabilizes a radical formed from the dithioester, whereby fewer branches of the randomly branched polymer are formed through a dithioester radical than through the free radical formed from R. In general, fewer than 1% of branches are formed via the dithioester radical.

In the exemplary embodiment, the R group includes a polymerizable double bond which allows the R group to be incorporated into the polymer chain as a branch point. The Z-group can be any conventional organic group, however, it is matched with the monomer to provide a stable dithioester radical, as described in greater detail below.

Scheme 1 illustrates the reversible fragmentation of the chain transfer agent:

Scheme 1

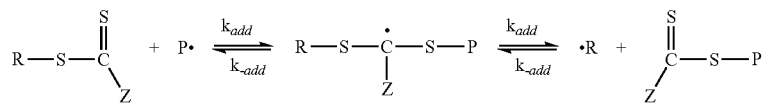

As seen in this scheme, the polymerizable R group is fragmented off to reinitiate polymerization during the RAFT process. The Z-group stabilizes the intermediate radical, which is a determining factor in the rate of the polymerization. In this scheme, P represents a radical formed from the monomer or polymerized monomer, optionally through the action of an initiator.

A specific example of this reaction scheme is given in Scheme 2 below for the case of benzyl-4-vinyldithiobenzoate as the chain transfer agent.

Scheme 2

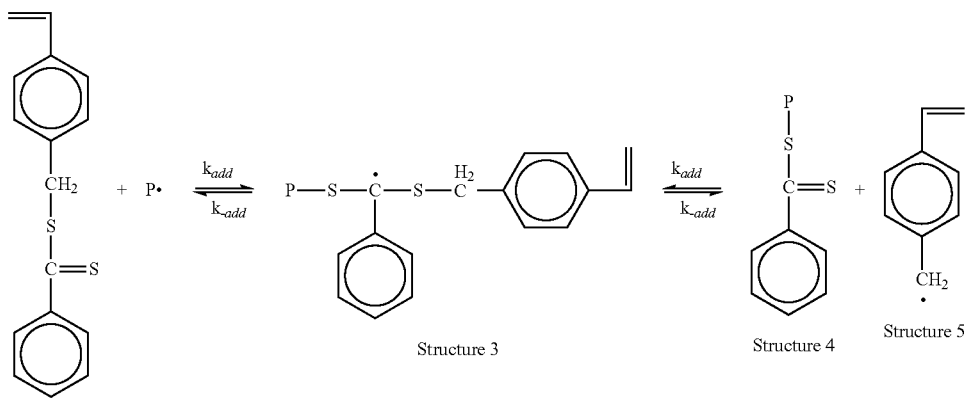

Structure 2, Structure 3, Structure 4, Structure 5

To ensure that the reactivity of the R group predominates, the tendency of the R group to donate or withdraw electrons is considered. In general, the withdrawing capability of the R group is balanced against that of the Z group. The R group may comprise a vinyl group and may have the general structure as shown in Structure 6. This structure contains a polymerizable double bond (e.g., a terminal vinyl group) so to incorporate into the polymer chain as a branch point:

Structure 6

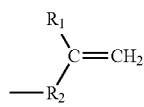

wherein $R_1$ and $R_2$ are independently selected from the group consisting of hydrogen, alkyl, aryl, alkoxy, aryloxy, carboxy, acyloxy, aroyloxy, alkoxy-carbonyl, aryloxy-carbonyl, $CO_2H$, CN, $CONH_2$, halogen, and substituted derivatives thereof; and where — represents the location of the R—S bond in Structure 1. In the exemplary embodiment, only $R_1$ can be H, and $R_2$ includes at least one carbon through which the R—S bond is formed.

Exemplary R groups include Structures 7, 8, 9, and 10:

Structure 7

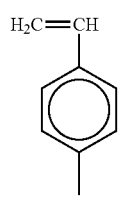

Structure 8

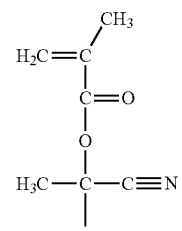

-continued

Structure 9

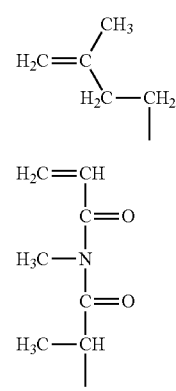

Structure 10 where — represents the location of the R—S bond.

The selection of the Z-group may be dependent on the monomer to be polymerized, and may also be influenced by the selection of a solvent, if the polymerization is performed in a solvent. The section of the Z group can be used to tune the reactivity depending on whether it is electron withdrawing or donating, or resonance stabilizing to give an optimum balance of radical stability and reactivity.

Exemplary Z groups include Structures 11, 12, 13, 14, 15, 16, 17, 18, 19, 20, 21, 22, 23, 24, 25, 26, 27, 28 and 29:

11

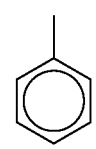

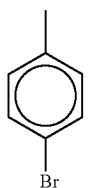

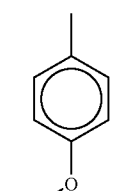

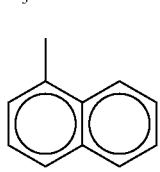

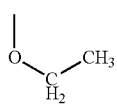

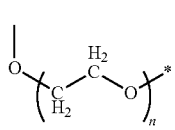

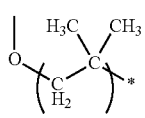

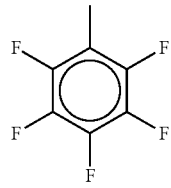

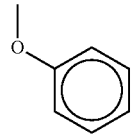

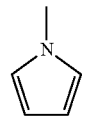

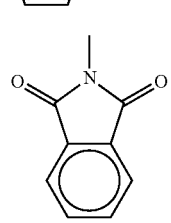

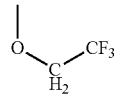

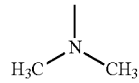

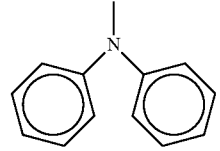

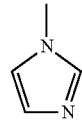

where n in structure 20 represents an integer and can be for example, from 1-10. and where | represents the Z—C bond in structure 1.

As will be appreciated from the above, when Z is of the general structure OR', as in structures 19, 20, 21, 23, and 26, Structure 1 is a xanthate. xanthates are particularly useful chain transfer agents in the case of vinyl acetate polymerization.

The monomer to be polymerized can be any polymerizable monomer typically used in RAFT or other polymerizations. However, in the exemplary embodiment, the monomer and CTA and the initiator (if employed) are selected to be kinetically compatible. Additionally, in the case of a polymerization carried out in a solvent, the polymer formed from the monomer should be soluble in the solvent in order to achieve an optimum balance of radical stability and reactivity.

Exemplary polymerizable monomers include alpha-beta unsaturated aromatic and aliphatic monomers (monomers with a terminal vinyl group), such as styrene, p-chloro styrene, p-methyl styrene, p-bromo styrene, isoprene, butadiene, methyl methacrylate, N,N dimethyl acrylamide, acrylamide, hydroxyethyl methacrylate, acrylic acid, vinyl acetate, tert-butyl acrylate, n-butyl acrylate, methyl acrylate, methacrylonitrile, acrylonitrile, N-isopropyl acrylamide, dimethyl amino methacrylate N-vinylcarbazole, N-vinylpyrrolidone, vinylpyridine, vinylimidazole, vinyl chloride, and combinations thereof.

In one embodiment, a single monomer is used. The monomer may be styrene and the polymer formed is then a randomly branched polystyrene. In one specific example, the CTA for styrene polymerization is 4-vinylbenzyl dithiobenozate.

The molar ratio of the monomer to CTA can be selected to achieve a polymer with a desired molecular weight. In one embodiment, the molar ratio of monomer (e.g., styrene) to the dithioester CTA is at least about 2:1 and can be up to about 1500:1. In another embodiment, the molar ratio of monomer to the CTA is at least about 50:1 or at least 200:1. In another embodiment, the ratio may be up to 1200:1 and in some embodiments can be about 500:1.

In some embodiments, an initiator may be employed. An exemplary initiator is one with a half-life ($t_{1/2}$) of about 10 hours, in particular, those which form radicals through photoexcitation or a redox reaction. Exemplary initiators include: azobis(isobutyronitrile), 4,4'-azobis(4-cyanovaleric acid), 2,2'-azobis(2-methylpropanenitrile), 2,2'-azobis(2-methylbutanenitrile), 1,1'-azobis(1-cyclohexanenitrile), azo-t-butane, dicumyl hyponitrile, t-butyl peroxide, dilauroyl peroxide, succinic acid peroxide, dibenzoyl peroxide, di-t-butyl peroxyoxalate, 2,2'-azobis(2-methylbutanenitrile), azoisooctane, dibutyl hyponitrile, dicumyl hyponitrile dicumyl peroxide, potassium persulfate, didodecanenoyl peroxide, and combinations thereof.

The polymerization can be performed in bulk, in solution (including aqueous or other solvents) in suspension or in emulsion to produce dendritic (co)polymers and block copolymers. Additionally, the exemplary materials allow for the ease and simplicity of one-pot synthesis.

Exemplary solvents which may be used in the case of solvent polymerization include toluene, benzene, tetrahyrofuran (THF), methyl ethyl ketone (MEK), or the like, in the case of water insoluble monomers, such as styrene. For water soluble monomers, water may be used as the solvent.

The reaction may be performed in the presence of an inert gas, such as nitrogen, argon, helium or the like, or other oxygen-free environment.

The reaction may be carried out at any temperature which is suitable to forming the free radicals and for ensuring progress of the polymerization. In the case of styrene polymerization, for example, a suitable temperature is in the range of 100-120° C. For isoprene as the polymerizable monomer, lower temperatures can be used, e.g., around 80° C., and for tert-butyl acrylate, around 60° C. may be suitable.

By way of example, Scheme 3 illustrates the polymerization of styrene when combined with the inimer (CTA) 4-vinylbenzyl dithiobenzoate, which may be performed in bulk. The result is a randomly branched polymer (polystyrene) with a higher molecular weight than can be achieved by conventional linear polymerization methods. The inimer (Structure 2) having the benzyl radical and the vinyl group on the same fragment (see Structure 5, Scheme 2) allow for the branching to form Structure 30:

Scheme 3

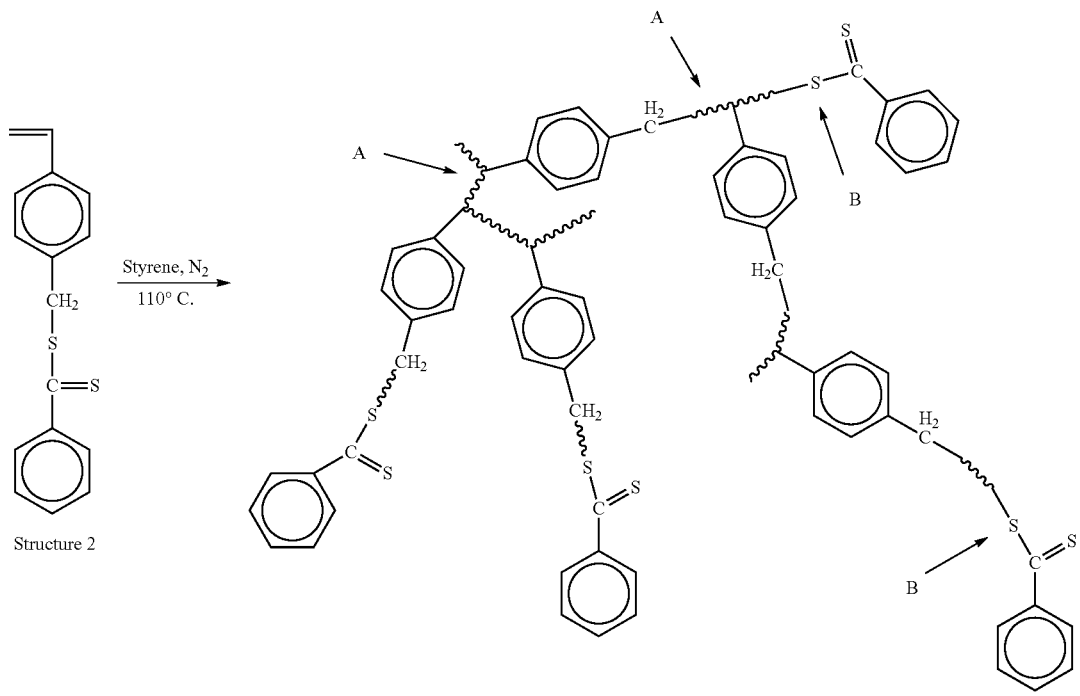

Structure 2

Structure 30 where A represents the styrene polymer chains and B illustrates dithioester moieties (S—C(=S)—Z) located at the terminal ends of those branches formed through the R group.

The dithioester moieties can subsequently be removed to yield an exemplary randomly branched polymer of the present disclosure which is substantially free of dithioester groups.

In one embodiment, the dithioester moieties are cleaved by adding a further charge of the monomer, e.g., styrene, or another reactive monomer, which may or may not be the same as is used in the primary reaction. For example, after the reaction in scheme 3 is complete, styrene is added, optionally, with an additional radical source, such as dicumyl peroxide. It is postulated that due the addition of dicumyl peroxide, high concentration of cumyl O radicals are generated, which preferentially react with the benzyl radicals that form via cleavage of the dithiobenzoate groups. This results in a permanently terminated polymer. This method can be used for functionalizing any of the randomly branched polymers described herein. This can yield multifunctional polymers, advantageous for filler interaction and improving tire properties.

The cleaving may includes addition of a compound yielding a suitable functional group to form block copolymers and/or functionalized monomers. The block copolymer product thus formed can have thermoplastic elastomeric properties and/or be amphiphilic.

In another embodiment, the dithioester moieties may be cleaved by aminolysis, for example, by reacting the polymer with an amine.

To prevent the polymer forming an insoluble gel, the polymer may be quenched by cooling rapidly, e.g., with dry ice, either prior to or subsequent to cleaving the dithioester moieties.

In one embodiment, the randomly branched polymer includes at least one repeating monomer unit wherein at least some of the branches are linked through a para-substituted vinyl benzyl unit as shown above in Structure 5. The para-substituted vinyl benzyl-derived unit constitutes less than 5 mol % of the monomer units which make up the polymer.

Following cleaving of the dithioester moieties, the polymer may comprise at least 95 mol % of monomer-derived units and less than 1 mol % of dithioester moieties, and generally, all sulfur containing units total less than 0.1 mol % of the monomer units which make up the polymer. Based on the disappearance of the color during the cleaving, it appears that no dithioester remains in the polymer.

Molecular weight distribution is determined as the ratio of the weight average and number average molecular weights ($M_w/M_n$) of the polymer formed. This is useful as a measure of the polydispersity of a polymer. The value of $M_w/M_n$ is 1 for a perfectly monodisperse polymer. The ratio is invariably >1 for actual polymers.

In one embodiment, the molecular weight distribution $M_w/M_n$ of the exemplary polymer is at least 1.4 or at least 1.5. In some embodiments, the $M_w/M_n$ is at least 1.8 or at least 2. The molecular weight $M_w$ of the polymer can be from about 0.5 kg/mole to about $1.0 \times 10^4$ kg/mole. The number average molecular weight can be from about 0.5 kg/mole to about $1.0 \times 10^4$ kg/mole. In one embodiment, $M_n > 100$ kg/mole. In another embodiment $M_n < 500$ kg/mole.

The number-average molecular weight of the polymer tends to increase linearly with conversion and is much higher than theoretically calculated for a linear polymerization, reaching $M_n = 364$ kg/mol with $M_w/M_n = 2.65$. The average number of branches per chain can be at least 3, e.g., at least 3 and can b up to about 20, or higher. By way of example, branching analysis by NMR showed an average of 3.5 branches per chain for copolymerization of styrene and 4-vinylbenzyl dithiobenzoate in bulk conditions using thermal initiation at 110° C. to give arborescent polystyrene (arbPSt). In another example, branching of about 20 branches per chain was achieved.

In one embodiment, a composition which incorporates the exemplary polymer contains at least 0.1% by weight of the polymer and an inorganic filler for rubber, such as carbon black, silica, alumina, aluminum hydroxide, zinc oxide, nanofillers and combinations thereof.

In one embodiment, the composition is used to form at least a part of a tire. The tire includes the exemplary polymer, in which case the polymer may comprise polyisoprene, polybutadiene, styrene-butadiene rubber (SBR) or combination thereof. As is known in the art, rubber compositions used in tire components may be compounded by known methods, such as mixing one or more sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants, and antiozonants, peptizing agents, and reinforcing materials such as, for example, carbon black and silica. As is known in the art, the additives mentioned are selected and commonly used in conventional amounts. The exemplary polymer may be incorporated along with the additives. In another aspect a biomedical device includes the exemplary polymer, in which case, it may comprise biocompatible monomers/polymer.

In one embodiment, a randomly branched polymer is formed by a process which includes combining a monomer or a mixture of monomers with a dithioester chain transfer agent, wherein the polymer has a molecular weight of at least 0.5 kg/mole and a molecular weight distribution of at least 1.5. The polymer may be formed by the above-described methods.

To demonstrate the branching occurring, the theoretical number average molecular weight $M_n$ for a linear controlled/living polymerization of styrene in the presence of 4-vinylbenzyldithiobenzoate (VBThB) (a case in which VBThB acts only as a chain transfer agent and not a monomer), can be calculated as follows:

$$M_{n,theo,lin} = \frac{[St]}{[VBThB]} \times M_{St} \times \text{conv.}$$

Due to the branching, more than one propagating center is adding monomer on each chain, which results in the actual number-average molecular weights being much greater than those expected from the theoretical calculations.

As will be appreciated, the exemplary method can be used to synthesize arborescent amphiphilic block copolymers. An arborescent polymer is formed by copolymerizing a first alpha-beta unsaturated aromatic or aliphatic monomer, such as styrene or tert-butyl acrylate with a dithioester chain transfer agent as described herein, such as 4-vinylbenzyldithiobenzoate to form an arborescent polymer formed primarily of the polymerized monomer. Once the monomer has been consumed, a second monomer may be added, which attaches to the terminal ends of the branches of the arborescent polymer. The second monomer can be an alpha-beta unsaturated aromatic or aliphatic monomer, as described above.

As an example, 4-vinylbenzyldithiobenzoate may be copolymerized with tert-butyl acrylate (first monomer) to form a branched poly(tert-butyl acrylate) (PtBA), as described herein. Post-polymerization hydrolysis, e.g., with an organic acid, such as trifluoroacetic acid, may be performed to convert the hydrophobic arborescent poly(tert-butyl acrylate) to hydrophilic arborescent poly(acrylic acid). The arborescent poly(acrylic acid) serves as a macroinimer which can be reacted with styrene (second monomer), e.g., in the presence of a free-radical initiator, such as azobisisobutyronitrile (AIBN) to form an arborescent block copolymer, arborescent poly(tert-butyl acrylate-styrene (arbP(tBA-b-S)). As will be appreciated, the synthesis can be reversed, with styrene used as the first monomer.

Without intending to limit the scope of the exemplary embodiment, the following examples demonstrate the preparation and properties of exemplary polymers in accordance with the exemplary embodiment.

EXAMPLES

Materials

For the following Examples, 4-vinylbenzyl chloride (90%) (Structure 34) was obtained from Acros Organics, Inc. Styrene≥99%, magnesium≥99.5%, carbon disulfide≥99.9%, and bromobenzene≥99% (Structure 32) were all obtained from Aldrich. The styrene was passed through a column of alumina (Brockmann Activity II) prior to use, to remove the inhibitor. Tetrahydrofuran (THF) was obtained from Aldrich and was dried over sodium metal and benzophenone. Carbon disulfide was dried over calcium hydride ($CaH_2$) for 4 hours, then vacuum distilled prior to use.

Example 1

Preparation of the Chain Transfer Agent: 4-Vinylbenzyldithiobenzoate (VBThB) (Structure 2)

4-vinylbenzyl dithiobenzoate (VBThB) was prepared according to reaction scheme 4, as follows. A 500 mL round bottom flask was dried with 3 vacuum/heat/nitrogen cycles. 100 mL of dry THF was added along with 3.3 grams of magnesium turnings. The mixture was placed in an oil bath set to 40° C., and 13.8 grams (0.088 moles) bromobenzene was added. 7.91 mL (0.088 moles) of dry carbon disulfide was added dropwise over the next 15 minutes. When all the carbon disulfide was added, the temperature was increased to 50° C., and 18.62 grams (0.088 moles) of 4-vinylbenzyl chloride was added. The solvent was removed. The crude product was purified via column chromatography over activated alumina (Brockman activity II). The final product was obtained as a red oil. The conversion was estimated at 48% after eluent removal.

The structure of the product was characterized by $^1H$ NMR spectroscopic techniques. The spectra gave the following results: $^1H$ NMR ($CDCl_3$): 4.59 (s, 2H, $CH_2$), 5.27 (d, 1H, $CH_2$=CH), 5.75 (d, 1H, $CH_2$=CH), 6.72 (dd, 1H, $CH_2$=CH), 7.25-7.45 (m, 7H, ArH) and 8.00 (d, 2H, ArH).

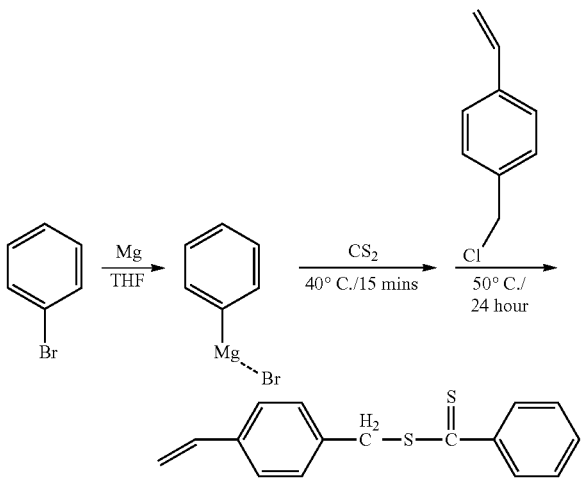

Scheme 4

Example 2

Inimer-Type RAFT Copolymerization of 4-Vinylbenzyldithiobenzoate (VBThB) (Structure 2) with Styrene (Molar Ratio of Monomer:Inimer=489:1)

4-vinylbenzyldithiobenzoate (Structure 2) was copolymerized with styrene by an inimer-type RAFT reaction, as follows. Styrene (327.9 g, 10.57 mol/L) and VBThB (1.74 g, 0.0215 mol/L) (Structure 2) were placed in a 500 mL round bottomed flask equipped with a magnetic stirbar. The reaction mixture was purged with dry nitrogen for 30 minutes before being immersed in a silicone oil bath at 110° C. Aliquots of approximately 5 mL were taken periodically throughout the course of the polymerization and precipitated into methanol. The reaction was continued until the viscosity increased too high to allow removal of additional aliquots (19 hours 53 minutes). The reactions (aliquots) were quenched by exposure to air and cooling in dry ice. Once the reaction mixture was at room temperature, it was precipitated in methanol. The conversions of the aliquots (numbered Sample IDs 1-4) and final product (Sample ID 5, 32% conversion) were determined gravimetrically. The resulting materials were found to have retained the pink color from the incorporation of VBThB and were completely soluble in THF demonstrating no gel fraction. Table 1 summarizes the data for the sample aliquots, where $M_n$ and $M_w$ are the number and weight average MWs, $R_{g,z}$ and $R_{h,z}$ are the z-average radii of gyration and hydrodynamic radii, and $\eta_w$ is the weight-average intrinsic viscosity, as measured by SEC. From the results, it can be concluded that high MW broad molecular weight distribution, branched (see conformation plots) polystyrene was formed.

TABLE 1

| Sample ID | Conversion (%) | Time (min) | $M_n$ (kg/mol) | $M_w$ (kg/mol) | $M_w/M_n$ | $R_{g,z}$ | $\eta_w$ (mL/g) | $R_{h,z}$ (nm) |
|---|---|---|---|---|---|---|---|---|
| 1 | 6 | 121 | 71.63 | 237.8 | 3.32 | 47.2 | 40.2 | 26.8 |
| 2 | 7 | 180 | 135.4 | 451.2 | 3.33 | 60.7 | 53.9 | 28.8 |
| 3 | 16 | 423 | 205.7 | 567.4 | 2.76 | 59.0 | 79.3 | 30.1 |

TABLE 1-continued

| Sample ID | Conversion (%) | Time (min) | $M_n$ (kg/mol) | $M_w$ (kg/mol) | $M_w/M_n$ | $R_{g,z}$ | $\eta_w$ (mL/g) | $R_{h,z}$ (nm) |
|---|---|---|---|---|---|---|---|---|
| 4 | 24 | 716 | 302.3 | 768.2 | 2.54 | 52.7 | 125.6 | 53.4 |
| 5 | 32 | 1193 | 364.5 | 964.8 | 2.69 | 63.5 | 180.7 | 61.3 |

Example 3

Inimer-Type RAFT Copolymerization of 4-Vinylbenzyldithiobenzoate with Styrene (Molar Ratio of Monomer:Inimer=978:1)

4-vinylbenzyldithiobenzoate (0.87 g, 0.0107 mol/L) was copolymerized with styrene (327.9 g, 10.57 mol/L) as described for Example 2, except as noted. Aliquots (Sample IDs 6-12) were taken and the reaction was continued until the viscosity increased too high to allow for additional aliquots (18 hours 14 minutes). The conversions of the aliquots and final product (Sample 20, 32% conversion) were determined gravimetrically. The resulting materials were found to have retained the pink color from the incorporation of VBThB (Structure 2) and were completely soluble in THF demonstrating no gel fraction. Table 2 summarizes the data.

TABLE 2

| Sample ID | Conversion (%) | Time (min) | $M_n$ (kg/mol) | $M_w$ (kg/mol) | $M_w/M_n$ | $R_{g,z}$ | $\eta_w$ (mL/g) | $R_{h,z}$ (nm) |
|---|---|---|---|---|---|---|---|---|
| 6 | 4 | 95 | 172.5 | 367.7 | 2.13 | 36.6 | 86.6 | 22.9 |
| 7 | 6 | 164 | 147.9 | 387.8 | 2.62 | 45.5 | 86.2 | 24.2 |
| 8 | 8 | 216 | 299.1 | 623.4 | 2.08 | 44.6 | 138.3 | 43.2 |
| 9 | 10 | 300 | 244.3 | 507.9 | 2.08 | 45.8 | 118.8 | 32.3 |
| 10 | 17 | 507 | 345.3 | 892.0 | 2.58 | 67.4 | 168.4 | 40.8 |
| 11 | 23 | 751 | 373.0 | 898.1 | 2.41 | 66.9 | 176.7 | 42.0 |
| 12 | 32 | 1094 | 311.9 | 591.2 | 1.90 | 55.0 | 140.2 | 31.1 |

As for Example 2, it can be concluded that high MW broad molecular weight distribution, branched polystyrene was formed.

Example 4

Inimer-Type RAFT Copolymerization of 4-Vinylbenzyldithiobenzoate (VBThB) with Styrene (Molar Ratio of Monomer:Inimer=244:1)

4-vinylbenzyldithiobenzoate (3.48 g, 0.0430 mol/L) was copolymerized with styrene (327.9 g, 10.57 mol/L) as described for Example 2, except as noted. Aliquots (Sample IDs 13-19) were taken and the reaction was continued until the viscosity increased too high to allow for additional aliquots (18 hours 14 minutes). The conversions of the aliquots (Sample IDs 13-18) and final product (24%) were determined gravimetrically. The conversions of the aliquots and final product (24%) were determined gravimetrically. The resulting materials were found to have retained the pink color from the incorporation of VBThB and were completely soluble in THF demonstrating no gel fraction. Table 3 summarizes the data.

TABLE 3

| Sample ID | Conversion (%) | Time (min) | $M_n$ (kg/mol) | $M_w$ (kg/mol) | $M_w/M_n$ | $R_{g,z}$ | $\eta_w$ (mL/g) | $R_{h,z}$ (nm) |
|---|---|---|---|---|---|---|---|---|
| 13 | 2 | 64 | 25.5 | 66.4 | 2.61 | 27.6 | 23.7 | 14.5 |
| 14 | 4 | 136 | 60.8 | 187.4 | 3.08 | 32.8 | 44.0 | 25.6 |
| 15 | 6 | 200 | 75.9 | 182.4 | 2.40 | 26.8 | 50.3 | 22.5 |
| 16 | 8 | 269 | 89.4 | 210.7 | 2.36 | 32.3 | 52.9 | 19.0 |
| 17 | 11 | 376 | 114.5 | 267.3 | 2.34 | 38.6 | 64.1 | 21.2 |
| 18 | 18 | 654 | 196.2 | 496.0 | 2.53 | 50.0 | 100.8 | 34.0 |
| 19 | 24 | 893 | 252.9 | 631.5 | 2.50 | 55.1 | 120.2 | 42.6 |

Example 5

Inimer-Type RAFT Copolymerization of 4-Vinylbenzyldithiobenzoate (VBThB) with Styrene (Molar Ratio of Monomer:Inimer=875:1)

4-vinylbenzyldithiobenzoate (0.964 g, 0.0119 mol/L) was copolymerized with styrene (327.9 g, 10.57 mol/L) as described for Example 2, except as noted. Aliquots (Sample IDs 20-23) were taken and the reaction was continued until the viscosity increased too high to allow for additional aliquots (4 hours 0 minutes). The conversions of the aliquots (Sample IDs 20-22) and final product (sample 23, 20%) were determined gravimetrically. The conversions of the aliquots and final product (32%) were determined gravimetrically. The resulting materials were found to have retained the pink color form the incorporation of VBThB and were completely soluble in THF demonstrating no gel fraction. Table 4 summarizes the data.

TABLE 4

| Sample ID | Conversion (%) | Time (min) | $M_n$ (kg/mol) | $M_w$ (kg/mol) | $M_w/M_n$ | $R_{g,z}$ | $\eta_w$ (mL/g) | $R_{h,z}$ (nm) |
|---|---|---|---|---|---|---|---|---|
| 20 | 3  | 53  | 135.5 | 335.0 | 2.47 | 39.1 | 75.5  | 26.3 |
| 21 | 9  | 118 | 215.1 | 525.5 | 2.44 | 57.1 | 107.4 | 29.6 |
| 22 | 14 | 180 | 227.8 | 446.9 | 1.96 | 45.5 | 113.4 | 28.0 |
| 23 | 20 | 240 | 255.7 | 411.0 | 1.61 | 37.2 | 113.2 | 24.9 |

Example 6

Cleavage of the Dithioester End Groups and Functionalization Using External Radical Source This synthesis demonstrated cleavage of the dithioester end groups from the exemplary polymer and functionalization using an external radical source. A sample of the reaction mixture of Example 3 (Sample ID 17) (0.398 grams) was dissolved in 35 mL of THF in a 100 mL round bottom flask. Styrene (15 mL) was added along with 80 mg of dicumyl peroxide as an additional radical source. The flask was stoppered using a rubber septum and purged with dry $N_2$ gas for 30 minutes. Prior to polymerization, the solution appeared to be a faint pink color, due to the dithioester end groups. The flask was then placed in an oil bath thermostated to 105° C. for 6 hours. Upon removal of the reaction vessel, the solution was clear, indicating that the dithioester groups had been removed and the end groups functionalized with styrene monomer units.

Example 7

Low Molecular Weight Styrene Polymerization (Comparative Example)

Styrene polymerization reactions were conducted at 116° C. in butyl acetate using a chain transfer agent (CTA) in combination with an external radical source as disclosed in Yang, et al., which is said to yield radicals as shown in the scheme below:

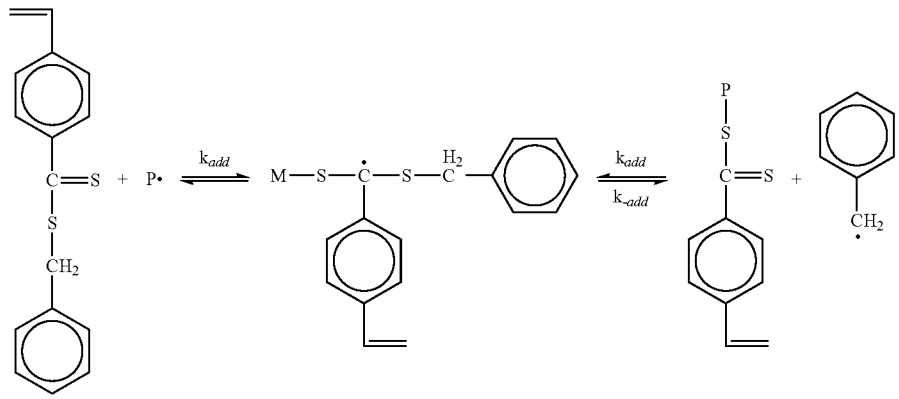

-continued

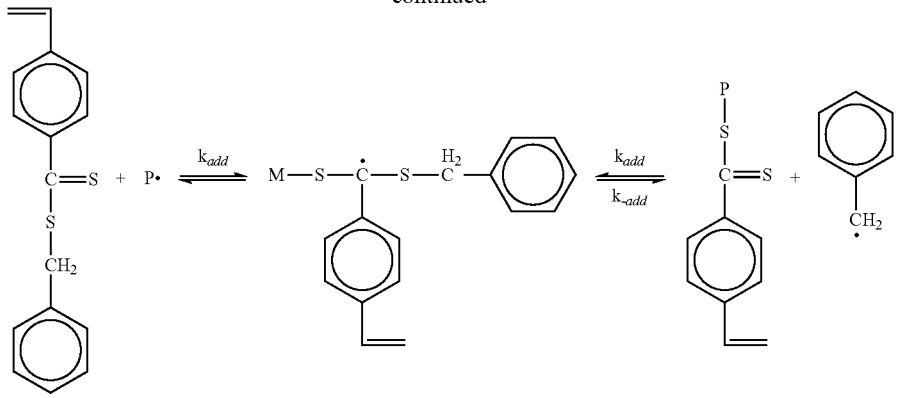

The reactions were conducted for a period of approximately 10 hours. Table 5 shows the results.

TABLE 5

| Sample ID | Conversion (%) | Styrene conc. Mol/L | CTA conc. Mol/L | [I] Mol/L | $M_n$ (kg/mol) | $M_w$ (kg/mol) | $M_w/M_n$ |
|---|---|---|---|---|---|---|---|
| C-1[a] | 35 | 1.59 | 0.0061 | 0.0013 | 23.3 | 50.5 | 2.17 |
| C-2[b] | 16 | 1.44 | 0.0054 | 0.0023 | 8.7 | 18.2 | 2.08 |
| C-3[b] | 44 | 1.44 | 0.0054 | 0.0021 | 12.4 | 33.6 | 2.71 |

External Radical Sources:
[a] 1,1-Bis(tert-butylperoxy)cyclohexane;
[b] dicumyl peroxide Example 8

Characterization

The chemical structures of some of the exemplary polymers formed in Examples 2-6 and comparative polymers of Example 7 were characterized using routine Size Exclusion Chromatography (SEC) Analysis. Samples were analyzed using a Waters setup equipped with six Styragel columns (HR0.5, HR1, HR3, HR4, HR5, and HR6), a Wyatt Technology Viscostar viscometer, a Wyatt Optilab DSP RI detector (thermostatted at 40° C.), Wyatt DAWN EOS 18 angle Multiangle Light Scattering (MALS) detector, and a Wyatt Quasielastic Light Scattering QELS detector. The system is equipped with a continuous, recycling THF distillation with a flow rate of 1 mL/min. The columns are heated at a constant temperature of 35° C. Absolute molecular weights, radii of gyration, and hydrodynamic radii were determined using Astra software version 5.3.2.15, with a known dn/dc=0.183 for polystyrene.

The first aliquot of Sample 13 was analyzed by $^1$H NMR. The experiment was conducted on a Varian NMRS 500 MHz in CDCl$_3$. The relaxation delay was set to 5 sec and 256 scans were obtained. The spectrum was analyzed using ACD/SpecManager version 10.08.

FIG. 1 shows the $^1$H NMR spectra for Sample 13 along with a representative fragment of the expected branching point structure. The peaks at 7.08 and 6.60 are due to the resonance of the aromatic protons on both the styrene and VBThB. Peaks A and B are both indicative of polystyrene. Peak A represents both protons on the CH$_2$ in the polymer backbone, while B includes three peaks, one for each distinct methine triad on the polystyrene backbone. The small, broad peak at 4.50 ppm (C) is assigned to the methine proton adjacent to the remaining dithioester moiety at the end of every branching point. The $^1$H NMR integrations show a 73:1 ratio of styrene to VBThB. With the degree of polymerization n=245, the average number of branching points per polymer chain is B=245/73=3.5. However, there is a distribution of branching density across the molecular weight, with the higher molecular weight having more branches.

Figure 2:
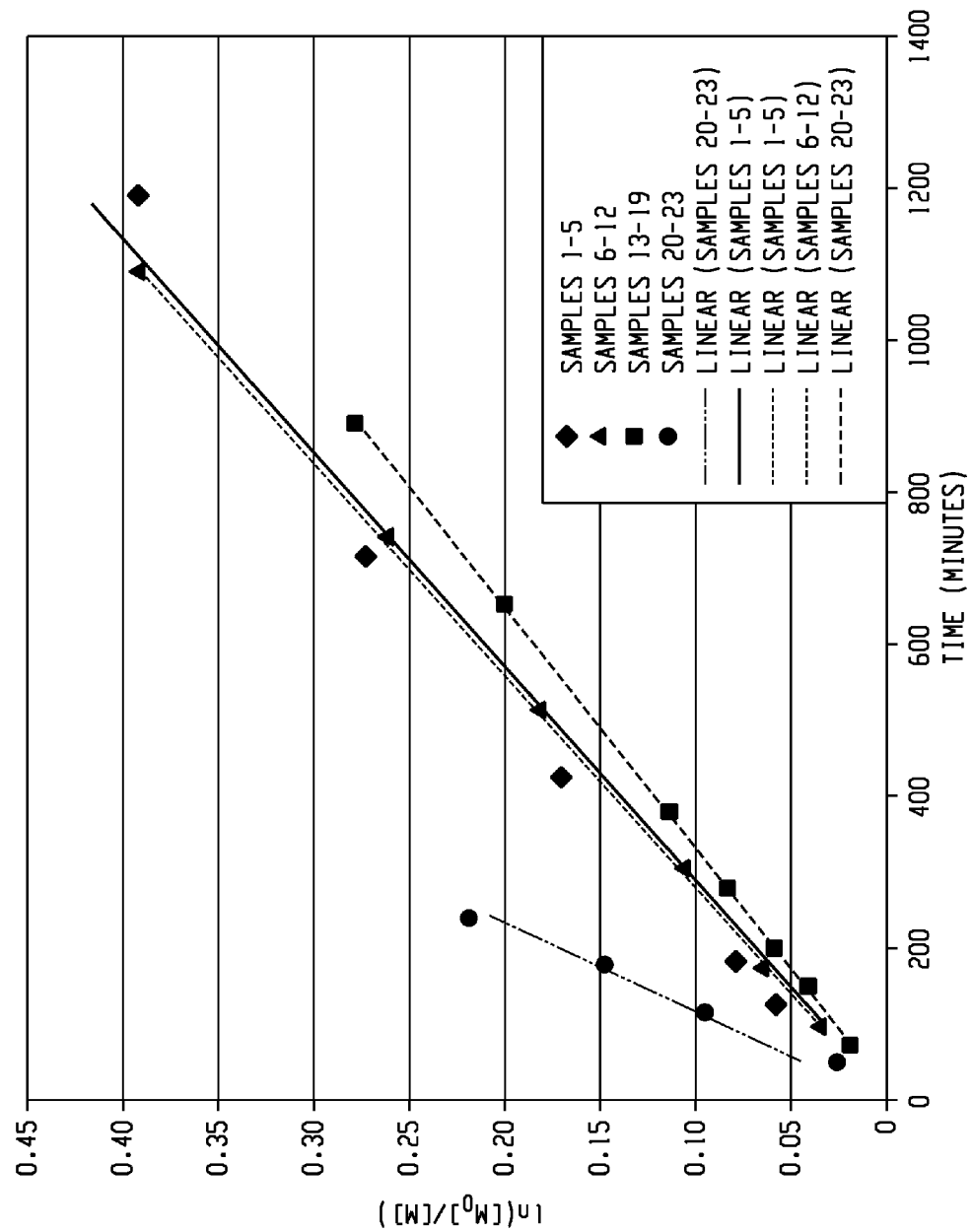
FIG. 2 shows pseudo-first order kinetic rate plots for exemplary polymers in accordance with the exemplary embodiment over a time period of 1200 minutes.
Figure 3:
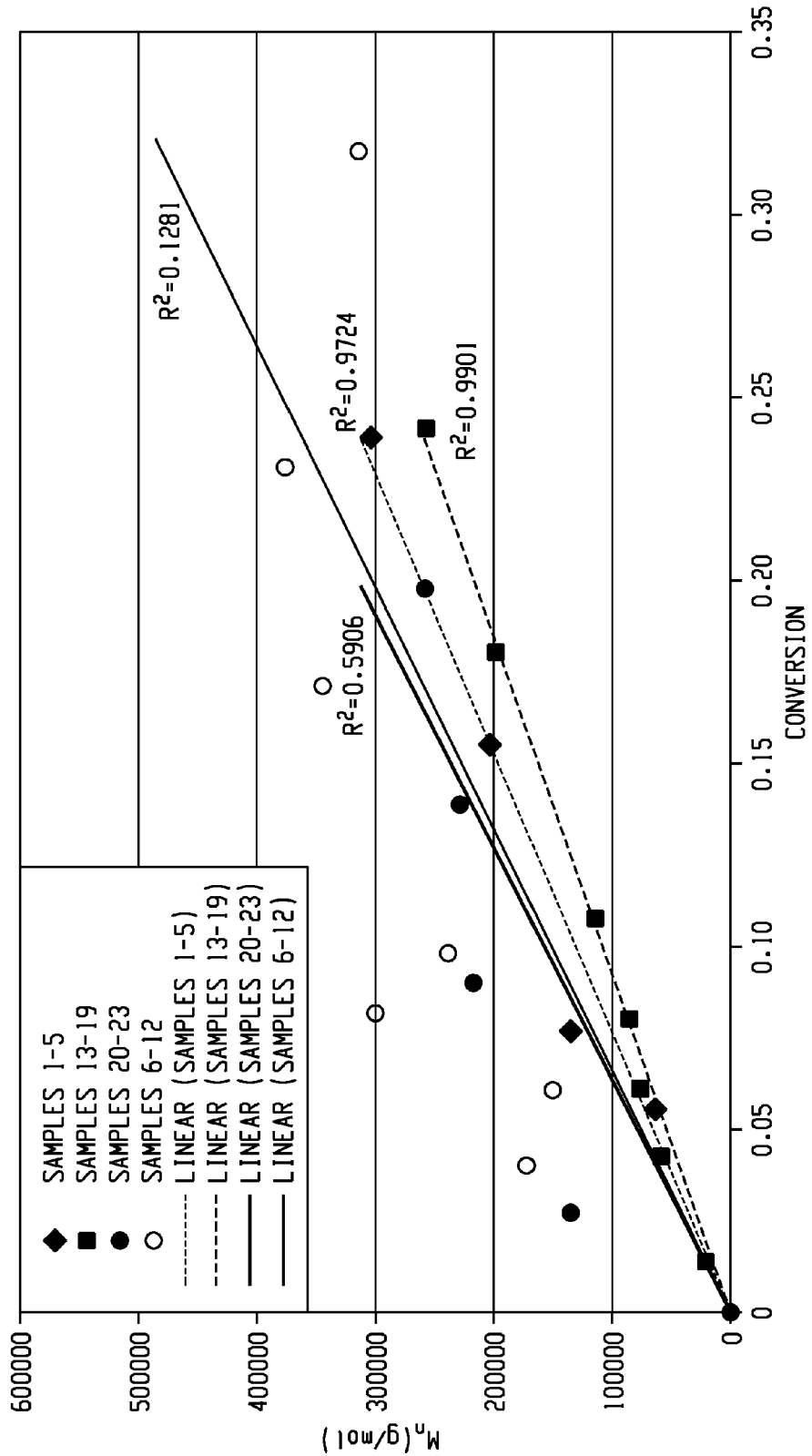
FIG. 3 is a plot of number-average molecular weight of exemplary polymers versus conversion on a scale of 0-1, where 1 represents 100% conversion.

FIG. 2 shows a pseudo-first order kinetic rate plot for in accordance with the exemplary embodiment for several examples over a time period of 1200 minutes. The ratio $M_0/M$ is the molar ratio of the monomer in the reaction mixture at the start of the reaction ($M_0$ at time=0) to the monomer at the time the aliquot was taken (M at time=t). FIG. 3 is a plot of number-average molecular weight of the exemplary polymer versus conversion in the range of 0 to 33%. FIGS. 2 and 3 suggest living conditions for Samples 1 and 13 but not for Sample 20. The linear increase demonstrated in the plots of Number Average Molar Mass ($M_n$) versus conversion and the rate plot ($\ln([M_0]/[M])$ versus time) greater than approximately 0.015 mol/L CTA concentration, confirms the suppression of termination and chain transfer. The linearity of the plots also indicates negligible additional thermal self-initiation of the styrene during polymerization. The $M_n$ decreased with increasing CTA concentration, while the rate appeared to be independent of CTA concentration. At CTA=1.19 and 1.07 mol/L (samples 6 and 20), the $M_n$ conversion plot is not linear, suggesting chain transfer and/or additional thermal initiation.

Figure 4A:
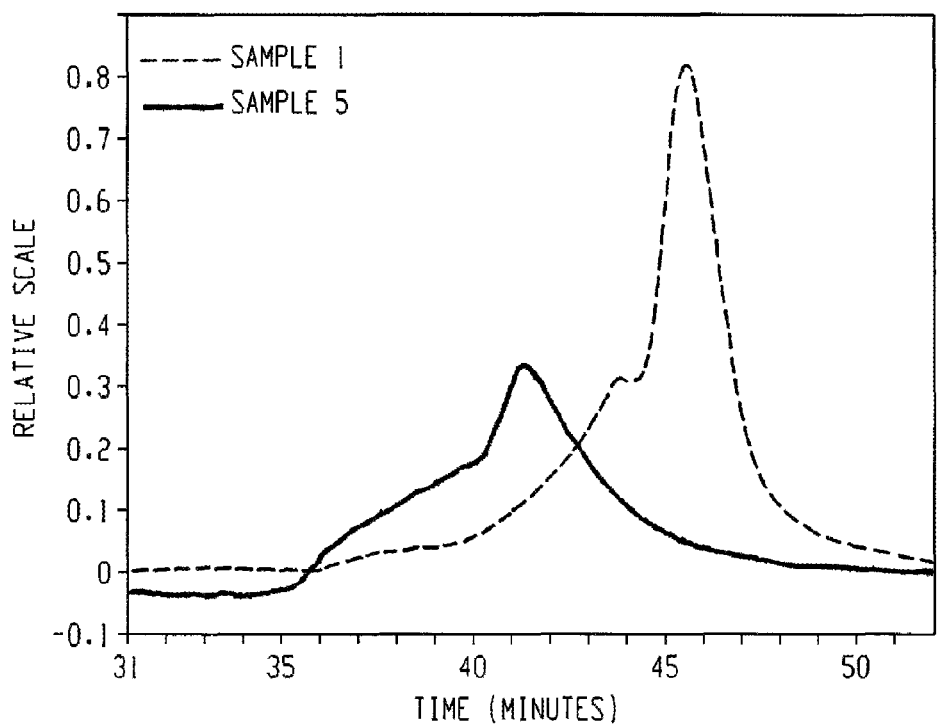
FIG. 4 shows (SEC) Refractive Index Traces of a polymer in accordance with the exemplary embodiment for low and high conversion aliquots (A is for Example 2) (B is for Example 3)
Figure 4B:
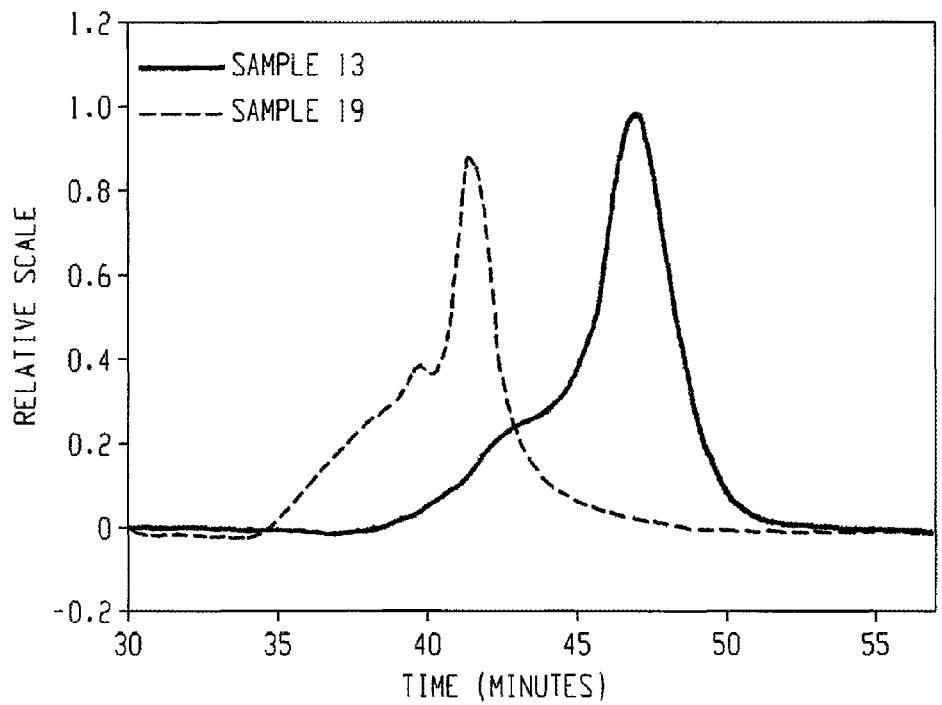
Figure 5A:
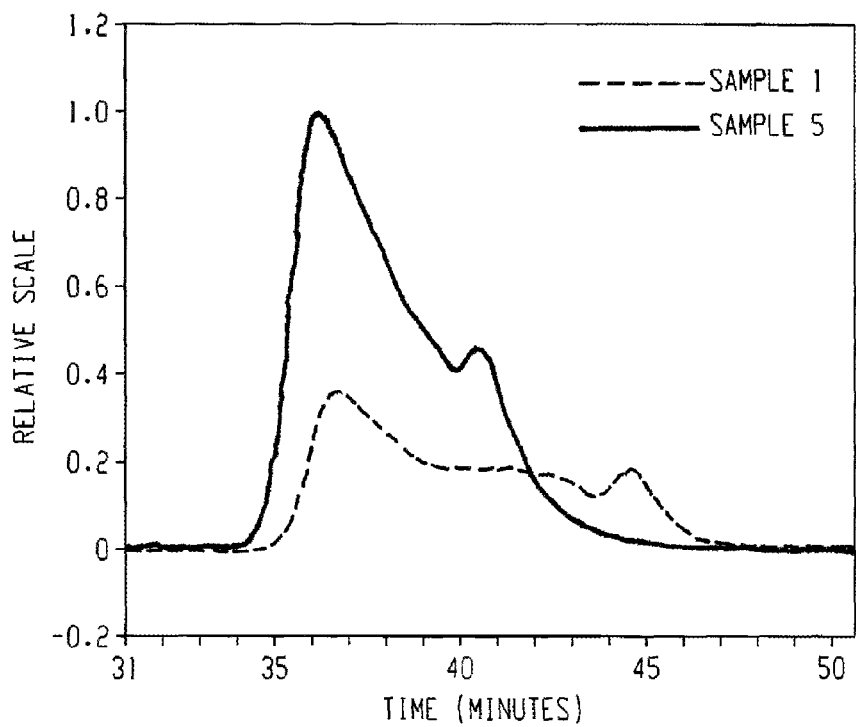
FIG. 5 shows (SEC) Rayleigh Ratio Traces of polymer in accordance with the exemplary embodiment for low and high conversion aliquots (A is for Example 2) (B is for Example 3)
Figure 5B:
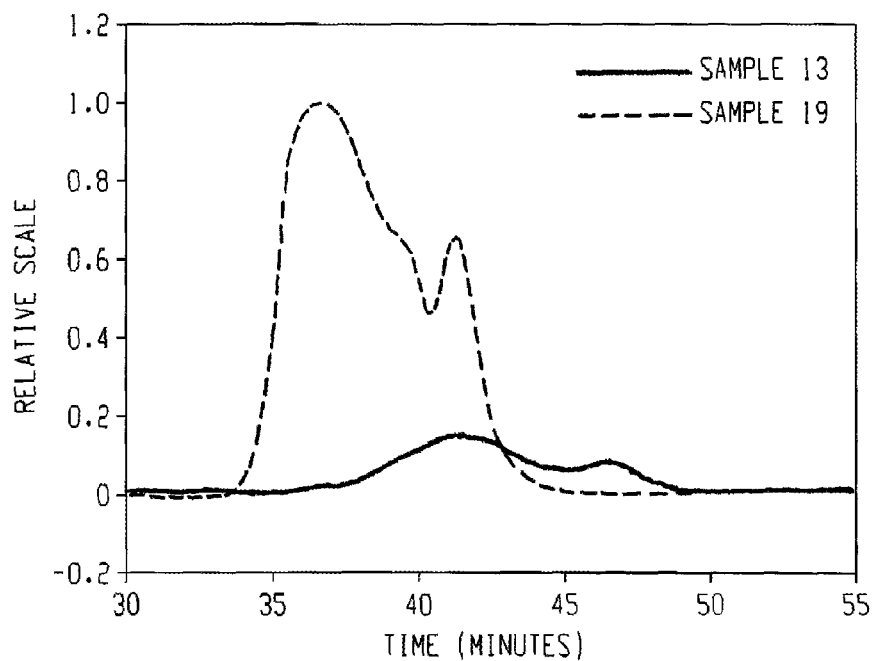
Figure 6:
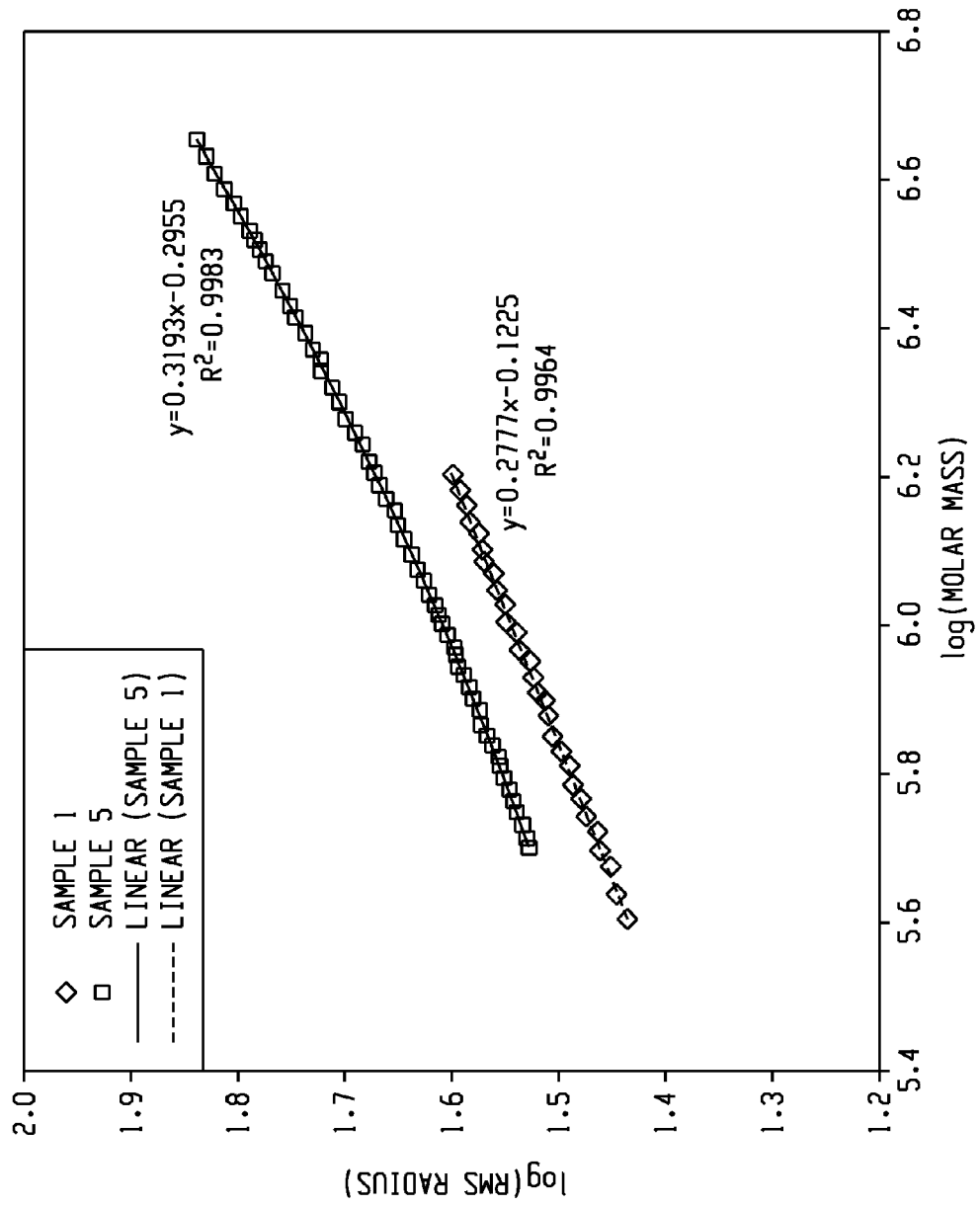
FIGS. 6-9 show conformation plots of polymers in accordance with the exemplary embodiment in the log(molar mass) range of about 5.4-6.7.
Figure 7:
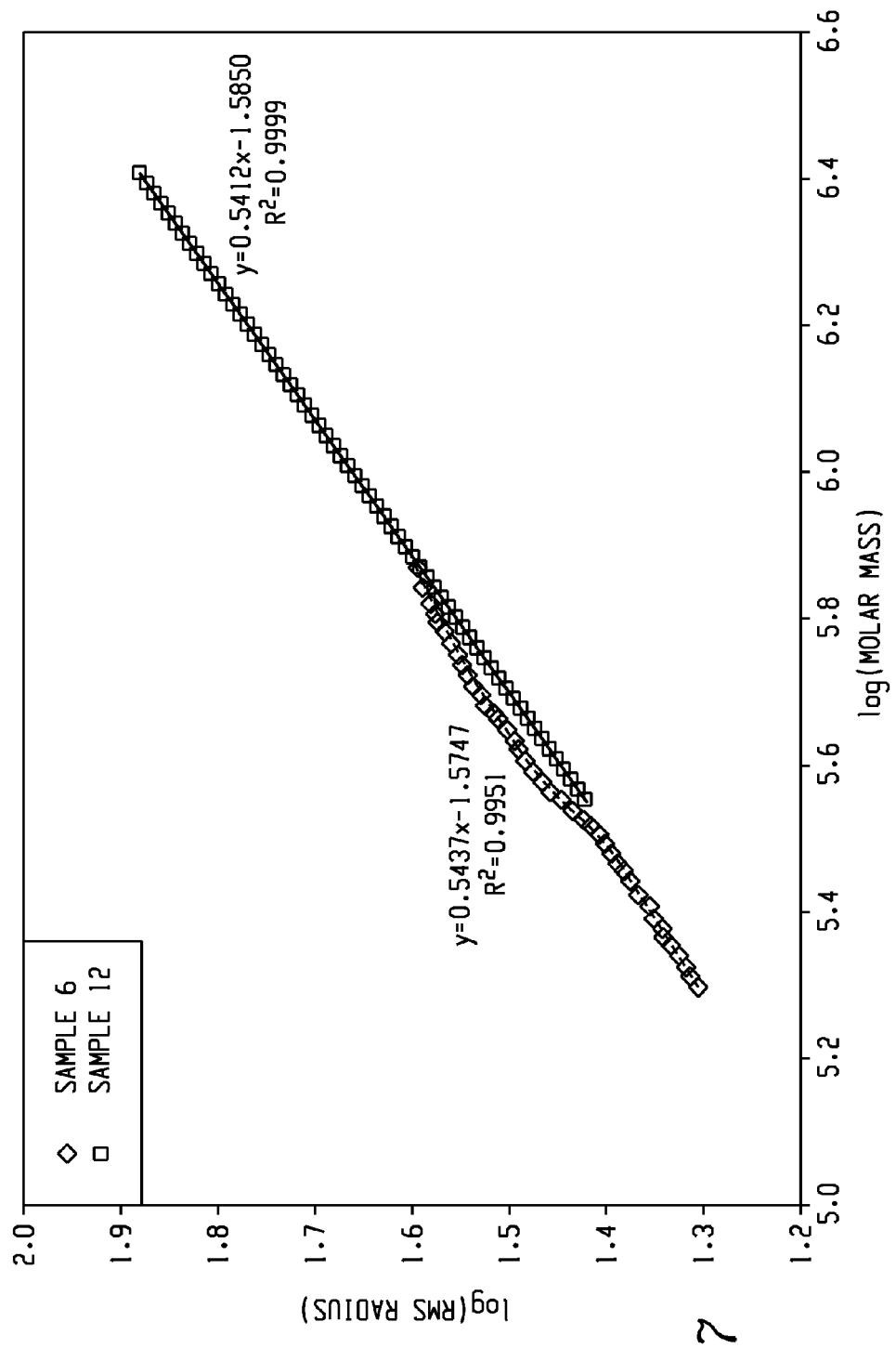
Figure 8:
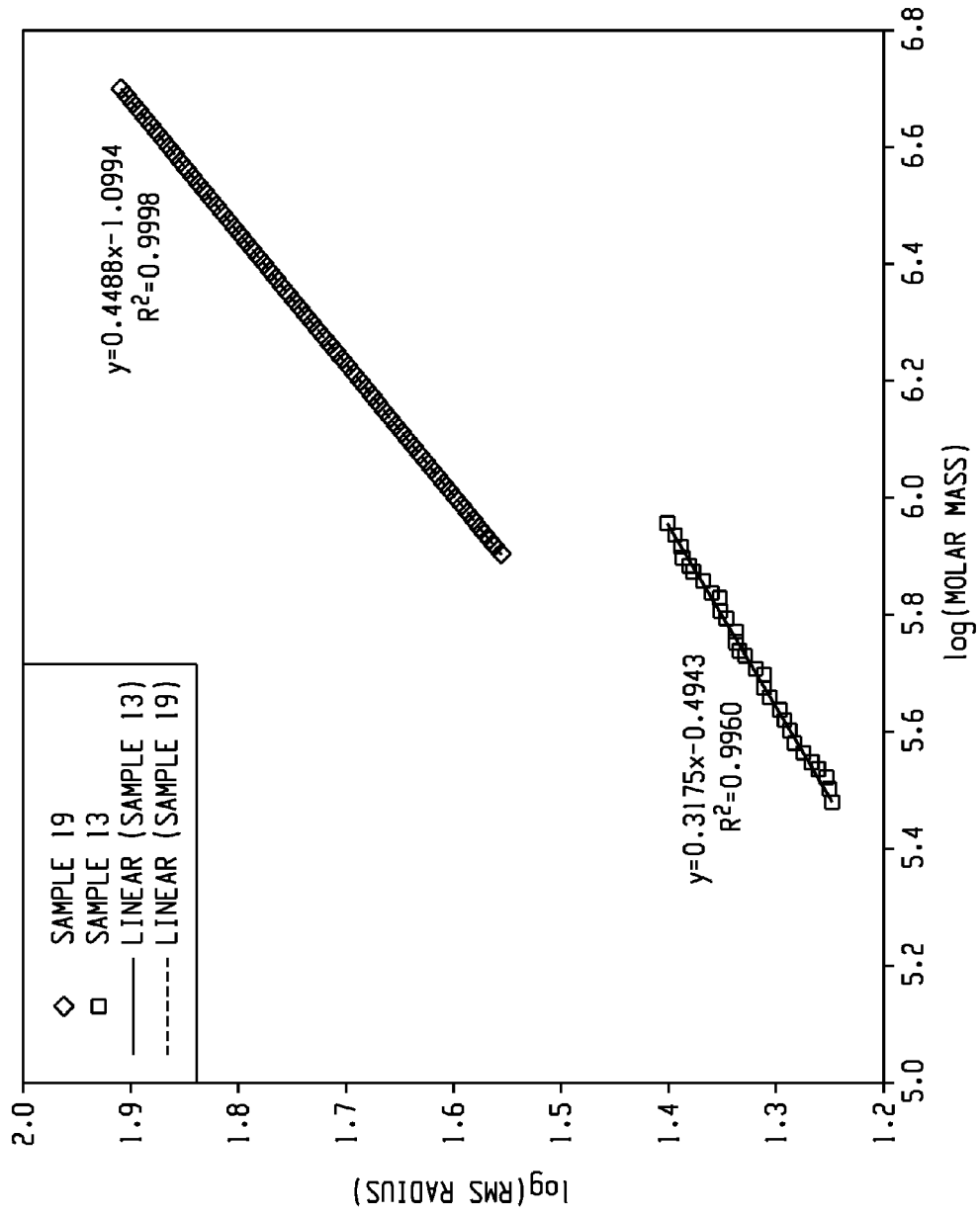
Figure 9:
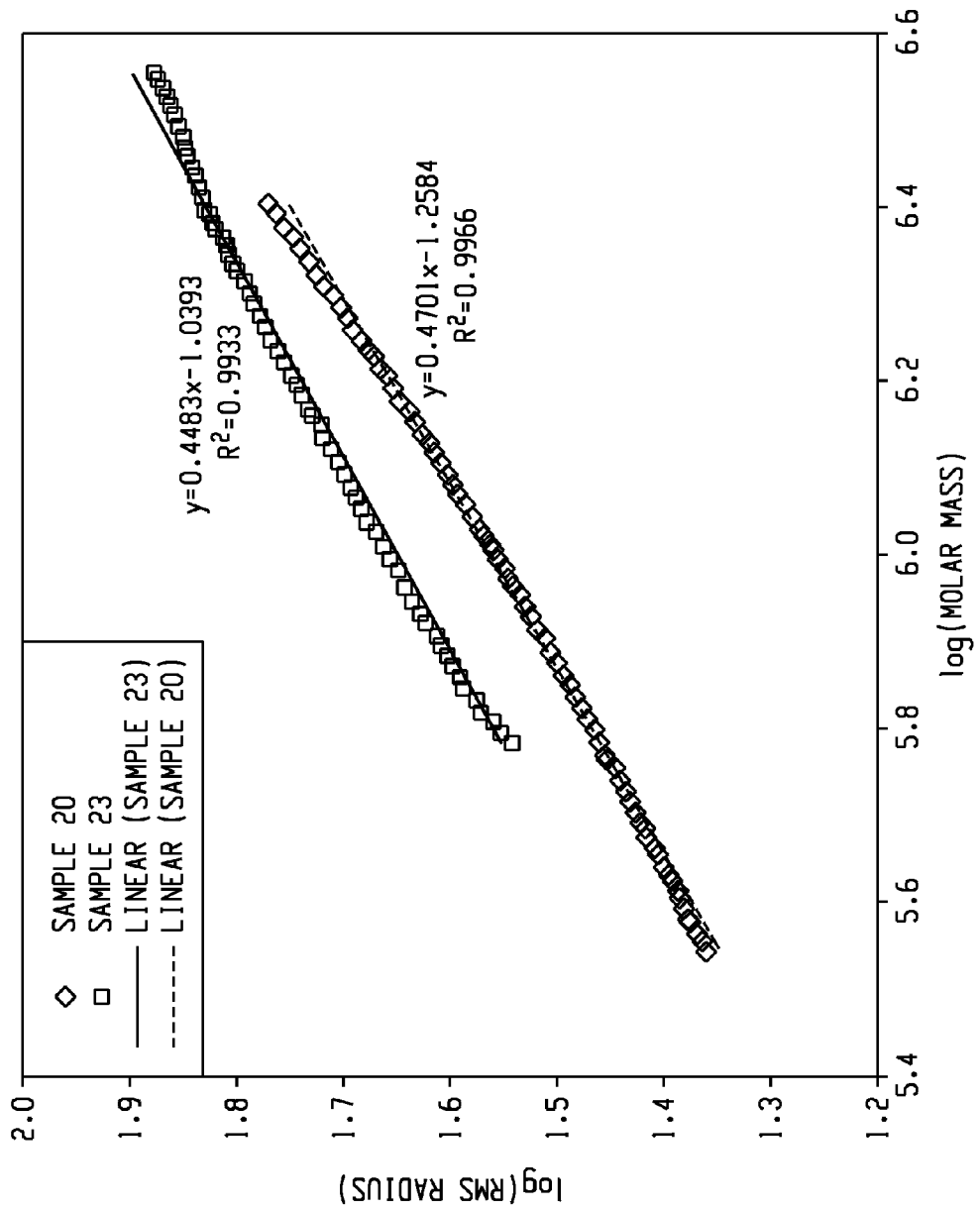

FIG. 4 shows (SEC) Refractive Index Traces of a polymer in accordance with the exemplary embodiment for low and high conversion aliquots. FIG. 5 shows (SEC) Rayleigh Ratio Traces of a polymer in accordance with the exemplary embodiment for low and high conversion aliquots. The SEC refractive indexes shown in FIG. 4 and the SEC Rayleigh ratios shown in FIG. 5 traces were performed for the first and last aliquots of samples 1, 5, 13, and 19. The aliquots taken during the reaction displayed a broad, multimodal distribution. The multimodal/broad distribution is known to lead to improved processability and combination of properties.

Example 9

Branching Analysis

To determine branching of the exemplary polymers, the following equations were used. g', which represents the ratio of the Intrinsic Viscosity ($\eta_w$) of the branched polymer to the linear polymer at the same molecular weight, was calculated from Equation 1:

$$g' = \eta_{w,br}/\eta_{w,lin} \qquad \text{Eqn. 1}$$

This shows the dependence of the intrinsic viscosity of a polymer on its relative molecular mass (MW). $\eta_{w,lin}$ was calculated from the Mark-Houwink-Sakurada equation (Equation 2) with K=0.0131 mL/g and α=0.7103, obtained with linear polystyrene standards using the SEC. A value of g'<1 indicates branching.

$$[\eta_{w,lin}] = K \times M_r^\alpha \qquad \text{Eqn. 2}$$

It may be noted that the values K=0.0098 mL/g and α=0.746 used by Yang, et al. gave similar values.

The randomly branched polymers were also analyzed by SEC using three parameters: g, h, and ρ, which aid in the identification of the polymer architecture as defined by Stockmayer, et al., *Macromolecules*, 13, 1265-1272, 1980. (Hereinafter, Stockmayer, et al.). Stockmayer, et al., formulated several equations to quantify the number of branches in a polymer based on comparing to a linear variant of the same polymer. Three of the most relevant Stockmayer, et al., equations are Equations 3, 4 and 5:

$$g = \left(\frac{\langle r_g^2 \rangle_{br}}{\langle r_g^2 \rangle_{lin}}\right)_{M_w} \qquad (3)$$

$$h = \left(\frac{D_{lin}}{D_{br}}\right)_{M_w} = \left(\frac{R_{h,br}}{R_{h,lin}}\right)_{M_w} \qquad (4)$$

$$\rho = \left(\frac{\langle r_g^2 \rangle_z^{1/2}}{\langle r_h \rangle_z}\right) \qquad (5)$$

The g and h parameters are defined by the geometric and hydrodynamic dimensions, respectively, where the dimensions are compared to linear, monodisperse sample at the same weight-average molecular weight. ρ is a dimensionless parameter that is independent of bond angles and degree of polymerization, but remains a function of branching, polydispersity, and branch flexibility. (See Stockmayer, et al.) Table 6 summarizes the data.

TABLE 6

| Sample ID | g' | ρ | g | h |
|---|---|---|---|---|
| 1 | 0.462 | 1.76 | 6.72 | 1.81 |
| 2 | 0.390 | 2.11 | 4.85 | 1.35 |
| 3 | 0.486 | 1.96 | 3.40 | 1.24 |
| 4 | 0.617 | 0.99 | 1.83 | 1.85 |
| 5 | 0.753 | 1.04 | 1.98 | 1.86 |
| 13 | 0.687 | 1.90 | — | 2.02 |
| 14 | 0.602 | 1.28 | 4.42 | 1.98 |
| 15 | 0.701 | 1.19 | 3.05 | 1.77 |
| 16 | 0.664 | 1.70 | 3.68 | 1.37 |
| 17 | 0.677 | 1.82 | 3.86 | 1.34 |

TABLE 6-continued

| Sample ID | g' | ρ | g | h |
|---|---|---|---|---|
| 18 | 0.681 | 1.47 | 2.91 | 1.51 |
| 19 | 0.681 | 1.29 | 2.58 | 1.65 |
| 20 | 0.677 | 1.49 | 2.96 | 1.46 |
| 21 | 0.695 | 1.93 | 3.52 | 1.27 |
| 22 | 0.826 | 1.63 | 2.76 | 1.32 |
| 23 | 0.876 | 1.49 | 2.05 | 1.23 |

Where g'<1, this verifies branching, according to Stockmayer et al. Stockmayer, et al. reported that values of ρ=1.73, g>2, and h>1 indicate perfectly random branching. When one or more of the parameters are outside of these ranges, the polymer can still be branched. Based on this principle, it can be seen that all samples, except Samples 4 and 5, meet the last two criteria, while several of the samples meet (including all those shown in Table 6), or are close to meeting, the first criterion.

Example 10

Conformational Analysis

A method of analyzing the conformation of a polymer chain is the conformational plot, which is a log-log plot of radius of gyration versus molar mass. It has been determined that for the SEC system used in these examples, conformation plots of linear polystyrenes fit the following Equation 6:

$$\log(R_{g,z}) = 0.6477 M_w - 2.222 \qquad (6)$$

A conformation plot slope of less than 0.6477 for $R_g$ indicates a macromolecule that is in a more compact conformation, at a given molecular weight, than its linear counterpart. A slope of 0.33 indicates a spherical conformation. FIGS. 6-9 show conformation plots of polymers in accordance with the exemplary embodiment in the log(molar mass) range of about 5.4-6.7. These plots show the conformation plots for the first and last aliquots for the exemplary arborescent polymers disclosed in Examples 2-6. The slopes of the conformation plots of the example polymers range from 0.28-0.47, which are all below that of a linear polystyrene random coil. This indicates that the exemplary polymers are in a more compact conformation than a random coil, which is characteristic of branched molecules. By way of comparison, the slope of this plot for a random polystyrene coil in THF at 25° C. has been determined to be 0.585 (or R=0.014M$^{0.585}$ (see Podzimek, S., et al., *Journal of Applied Polymer Science*, 82, 454-460, 2001).

Example 11

Inimer-Type RAFT Copolymerization of 4-vinylbenzyldithiobenzoate (VBThB) with Styrene in Toluene (Molar Ratio of Monomer:Inimer=519:1)

4-vinylbenzyldithiobenzoate (1.83 g, 0.0048 mol/L) was copolymerized with styrene (36.4 g, 2.49 mol/L) in toluene (100 mL) as described for Example 2. Aliquots (Sample IDs 24-30) were taken and the reaction was continued for 24 hours. The conversions of the aliquots and final product (29%) (Sample IDs 24-30) were determined gravimetrically. The resulting materials were found to have retained the pink color from the incorporation of VBThB and were completely soluble in THF demonstrating no gel fraction. Table 7 summarizes the data. A semilogarithmic rate plot of Ln([M$_0$]/[M]) vs. time in minutes and M$_n$ (g/mol) versus conversion plot for this polymerization were generated using data from Table 7. Both plots are linear, indicating suppression of termination and chain transfer events.

TABLE 7

| Sample ID | Conv. (%) | Time (min) | $M_n$ (kg/mol) | $M_w$ (kg/mol) | $M_w/M_n$ | $\eta_w$ (mL/g) | $R_{h,z}$ (nm) | g' |
|---|---|---|---|---|---|---|---|---|
| 24 | 1 | 57 | — | — | — | — | — | — |
| 25 | 3 | 122 | 3.1 | 3.3 | 1.08 | 3.5 | 1.2 | 0.89 |
| 26 | 7 | 277 | 5.6 | 6.2 | 1.12 | 6.1 | 2.0 | 1.10 |
| 27 | 10 | 374 | 7.8 | 8.6 | 1.10 | 6.8 | 2.2 | 0.93 |
| 28 | 18 | 693 | 11.8 | 13.8 | 1.17 | 9.6 | 3.0 | 0.97 |
| 29 | 26 | 1224 | 13.8 | 17.9 | 1.29 | 11.3 | 3.5 | 0.96 |
| 30 | 29 | 1445 | 17.4 | 21.6 | 1.24 | 12.6 | 4.0 | 0.95 |

Example 12

Inimer-Type RAFT Copolymerization of 4-vinylbenzyldithiobenzoate (VBThB) with tert-butyl Acrylate (Molar Ratio of Monomer:Inimer=1000:1)

Figure 10:
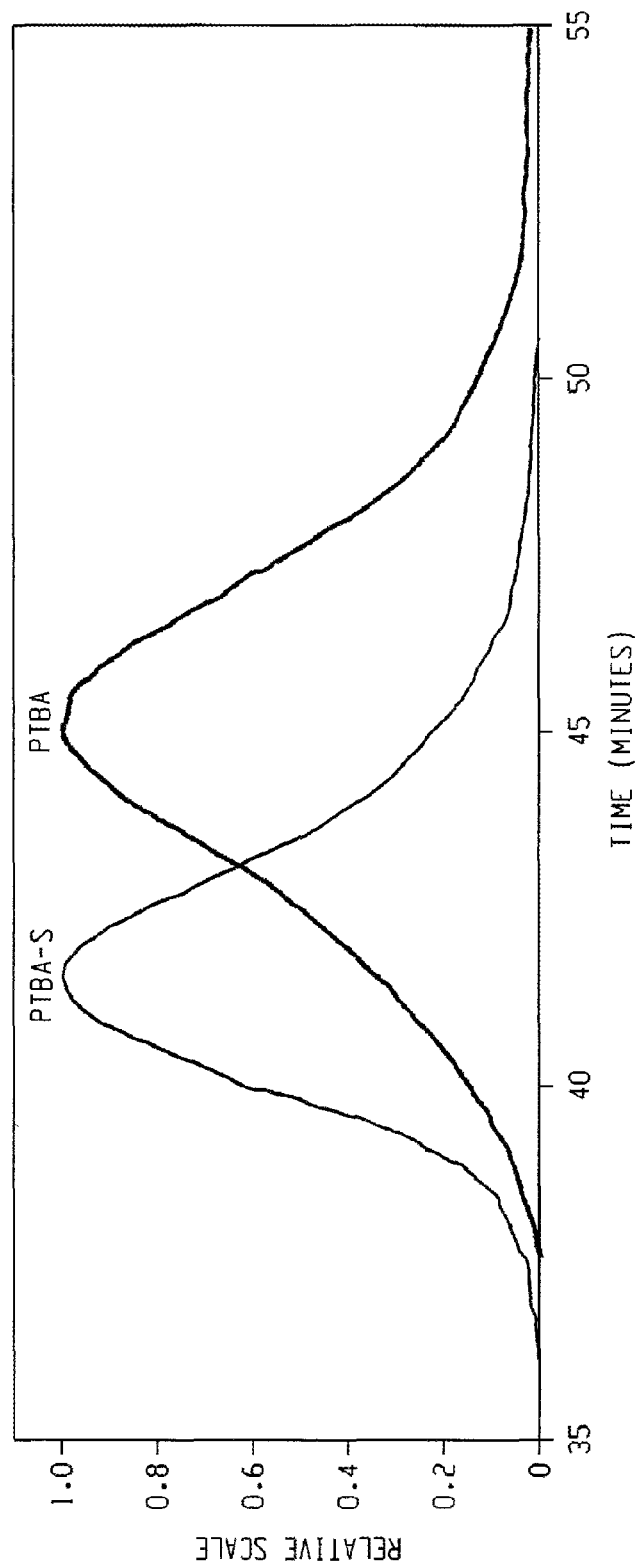
FIG. 10 shows overlaid SEC traces of the homopolymer of PtBA (Example 11) and the AB type block copolymer arbP (tBA-S) (Example 14)
Figure 13:
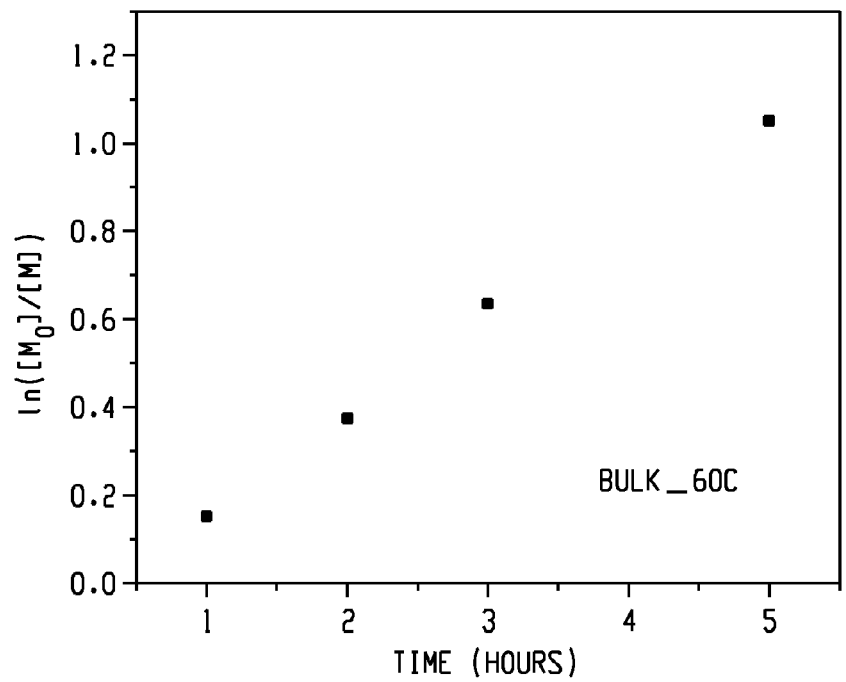
FIG. 13 shows the semilogarithmic rate plot for the polymerization in Example 12.
Figure 14:
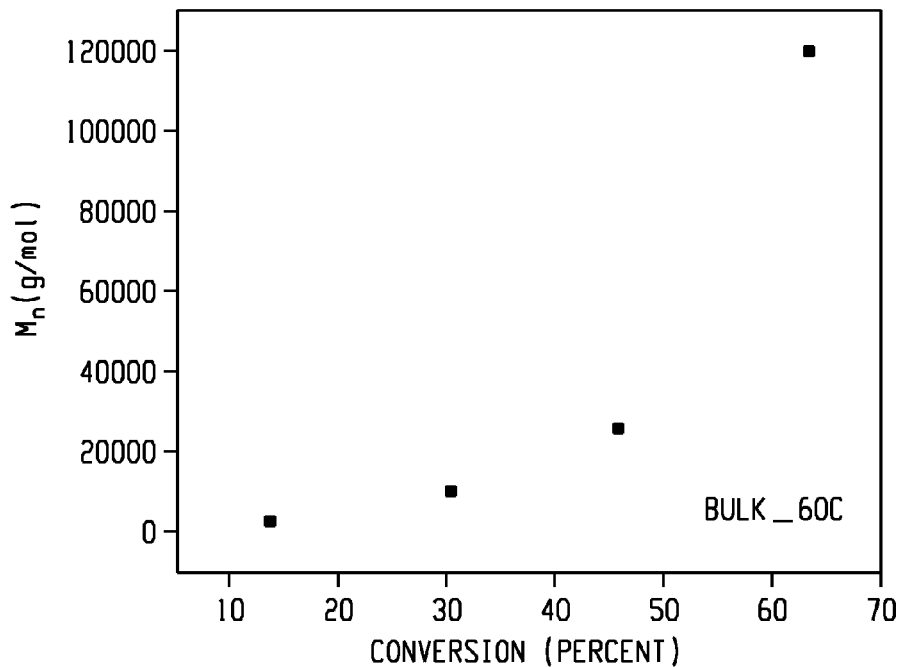
FIG. 14 shows the number-average molecular weight ($M_n$) versus fraction of converted monomer for Example 12.

4-vinylbenzyldithiobenzoate (Structure 2) was copolymerized with tert-butyl acrylate by an inimer-type RAFT reaction in bulk. tert-butyl acrylate (26.0 g, 0.2 mol), VBThB (0.06 g, 0.0002 mol) and AIBN (0.033 g, 0.0002 mol) were placed in a round bottomed flask equipped with a magnetic stirbar. The reaction flask was purged with dry argon for 45 minutes before being immersed in a silicone oil bath at 60° C. Aliquots were taken periodically throughout the course of the polymerization and precipitated into 50/50 V/V mixture of methanol/water. The reaction was continued until the viscosity increased to a point at which it was too high to allow removal of additional aliquots (5 hours). The samples were later filtered and tert-butyl acrylate was removed in the vacuum oven. The conversions of the aliquots (numbered Sample IDs 31-34) were determined gravimetrically. Table 8 summarizes the data for the sample aliquots. SEC traces of the polymer, performed as described above, obtained after 5 hrs. show a broad molecular weight distribution ($M_w/M_n$=3.05) and a multimodal peak (FIG. 10). A Mark-Houwink-Sakurada plot on this sample shows a value of a=0.38, which demonstrates a high degree of branching in the polymer. From the results, it is concluded that high MW broad molecular weight distribution, branched poly(tert-butyl acrylate) (PtBA) was synthesized. A semilogarithmic rate plot generated from the data was linear as can be seen in FIG. 13. $M_n$ increased exponentially with conversion as expected (FIG. 14).

TABLE 8

| Sample ID | Conversion (%) | Time (h) | $M_n$ (kg/mol) | $M_w/M_n$ | $\eta_w$ (mL/g) | $R_{h,z}$ (nm) |
|---|---|---|---|---|---|---|
| 31 | 14 | 1 | 2.8 | 1.21 | 8.6 | 2.0 |
| 32 | 31 | 2 | 10.2 | 1.37 | 32.5 | 5.1 |
| 33 | 47 | 3 | 25.8 | 1.99 | 73.2 | 7.9 |
| 34 | 65 | 5 | 119.4 | 3.05 | 231.1 | 31.5 |

Example 13

Hydrolysis of Arborescent poly(tert-butyl acrylate) to Arborescent poly(acrylic acid)

Post-polymerization hydrolysis was performed to convert hydrophobic arborescent poly(tert-butyl acrylate) (as formed in Example 12) to hydrophilic arborescent poly(acrylic acid). This method can be used to synthesize arborescent amphiphilic copolymers. Arborescent poly(tert-butyl acrylate) (5 g, $M_n$=41.9 kg/mol) was dissolved in $CH_2Cl_2$ (100 mL) and 15 mL of trifluoroacetic acid were added. The reaction was performed at room temperature overnight. The solvent and unreacted trifluoroacetic acid were removed by rotary evaporation. The polymer was dried under vacuum for a day. The resulting polymer was not purified any further. The final product was characterized by $^1$H NMR spectroscopy in DMSO (Scans=256, relaxation time=5 s). The spectrum, shown in FIG. 12, revealed the presence of carboxylic acid proton at 10.85 ppm. Integration of the peaks reveals that the conversion of ester to acid was 75%. The obtained polymer showed solubility in water.

Example 14

Synthesis of Arborescent poly(tert-butyl acrylate-b-styrene) (arbP(tBA-b-S)

Figure 11:
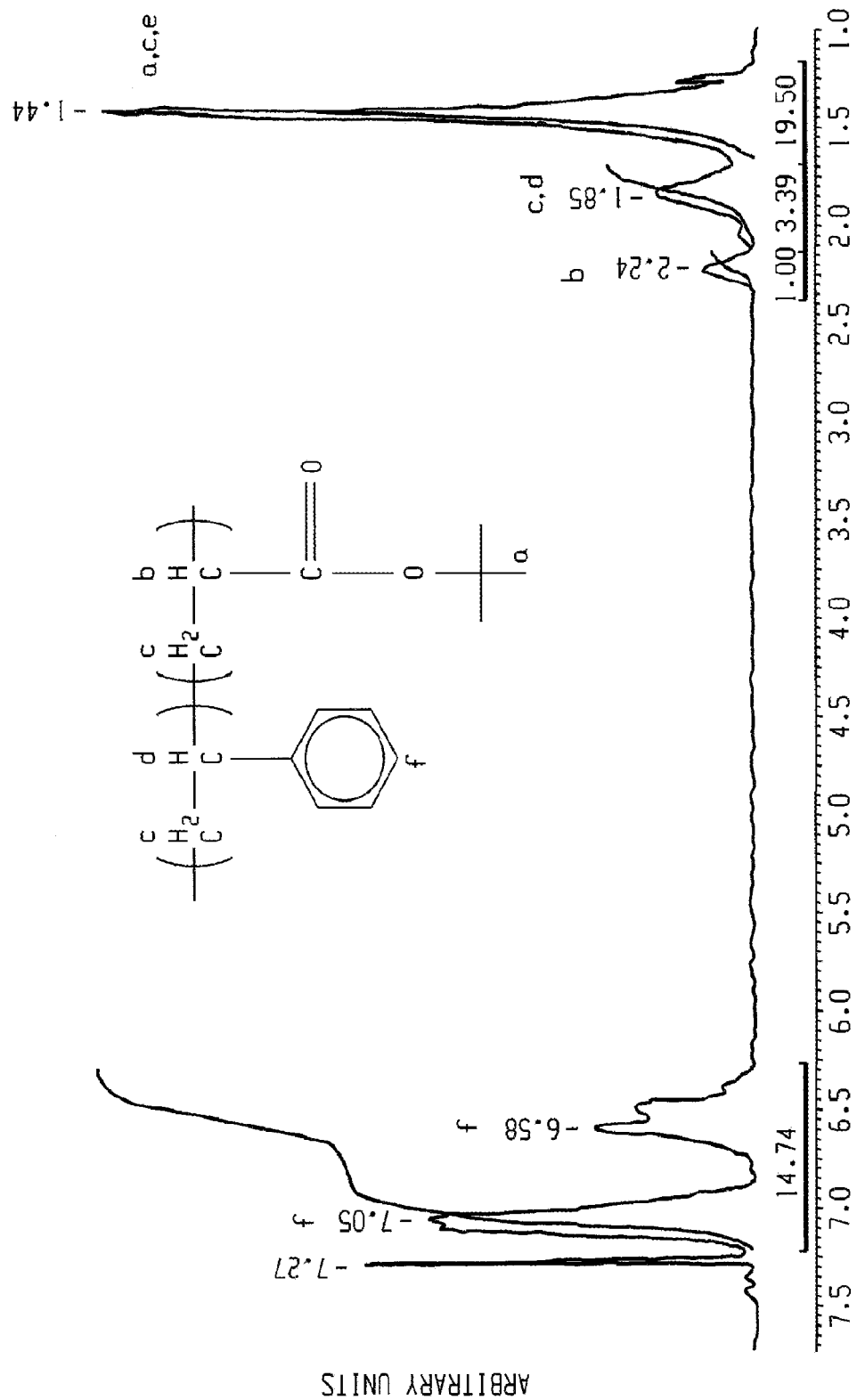
FIG. 11 shows an $^1$H NMR spectrum of the arbP(tBA-b-S) formed in Example 14.
Figure 12:
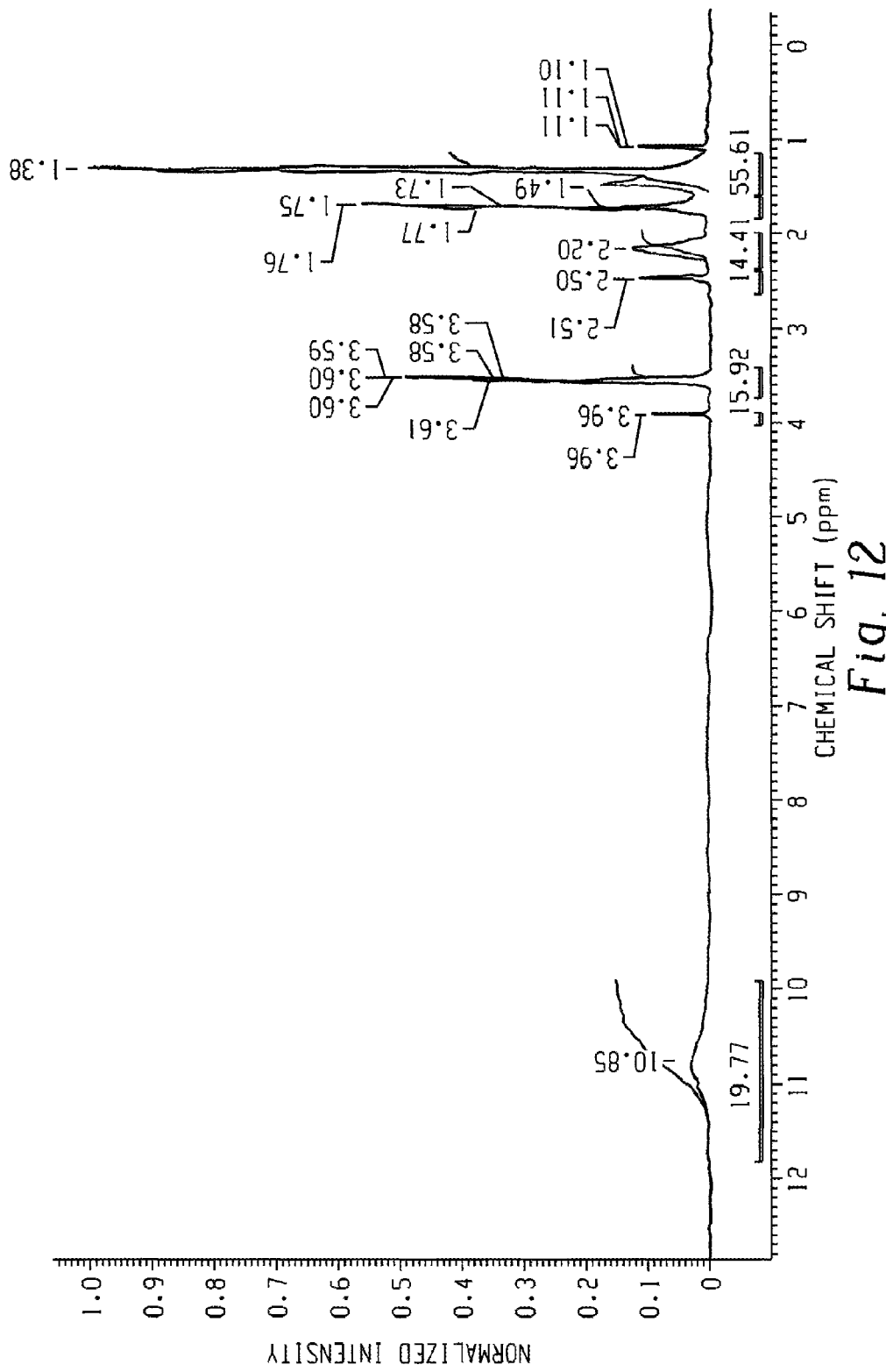
FIG. 12 shows a $^1$H NMR of poly(acrylic acid) in DMSO (Scans=256, relaxation time=5 s)

Chain extension studies were performed to prepare arborescent block copolymers. Arborescent poly(tert-butyl acrylate) (1 g, 0.024 mmol, molar mass=41.9 kg/mol, $M_w/M_n$=1.52) macroinimer, styrene (10 g, 100 mmol) and AIBN (0.001 mmol, 0.0002 g) were placed in a 50 mL round bottomed flask and stirred for 5 min to dissolve the polymer in the styrene. The flask was purged using argon for 45 min and immersed in an oil bath at 70° C. The reaction was allowed to proceed for 15 hrs. Then the final solution was precipitated in 2 L of 70/30 V/V mixture of methanol/water. The final polymer was dried in a vacuum oven. A light pinkish white polymer was obtained with a styrene conversion of 25% by gravimetry. Increase in the molar mass from 41.9 to 77.2 kg/mol was observed by SEC analysis (performed as described above). Overlaid SEC traces of the homopolymer of PtBA (Example 12) and the AB type block copolymer arbP(tBA-b-S) are shown in FIG. 10. The SEC and incorporation of the second block data are shown in Table 9. $^1$H NMR was performed as described above. The $^1$H NMR spectrum arbP(tBA-b-S) (300 MHz, 256 scans, relaxation time=10 s, solvent=$CDCl_3$), is shown in FIG. 11, and demonstrates the incorporation of styrene to the arborescent poly(tert-butyl acrylate). Aromatic protons from the styrene are observed between 6.25 and 7.25 ppm. The aliphatic protons from styrene and aliphatic protons from tert-butyl acrylate are overlapped between 1.1 and 2.4 ppm. Based on integration of the $^1$H NMR peaks, the final polymer has a 65.7 wt % polystyrene (PS) content. FIG. 12 shows a $^1$H NMR of poly(acrylic acid) in DMSO (Scans=256, relaxation time=5 s) for comparison.

TABLE 9

| Sample ID | Conversion (%) | Time (h) | $M_n$ (kg/mol) | $M_w/M_n$ | PS (mol %) | PS (wt %) |
|---|---|---|---|---|---|---|
| 35 | — | — | 41.9 | 1.52 | — | — |
| 36 | 25 | 15 | 77.2 | 1.43 | 70.2 | 65.7 |

Example 15

Inimer-Type RAFT Copolymerization of 4-vinylbenzyldithiobenzoate VBThB) with Isoprene in Toluene (Molar Ratio of Monomer:Inimer=519:1)

4-vinylbenzyldithiobenzoate (0.014 g, 0.0021 mol/L) was copolymerized with isoprene (3.4 g, 2.00 mol/L), using AIBN (0.0082 g, 0.0020 mol/L) as an initiator in toluene (20 mL). Reactions were performed in a borosilicate tube screw-capped with a PTFE cap and using an O-ring rubber seal. The filled tubes were placed in an oil bath at 80° C. Reactions were terminated at different times (Sample IDs 37-40) by pouring the reaction solutions into cold methanol. The solvent was removed by rotary evaporation. The conversions of the samples were determined gravimetrically. Conversion was found not to increase after 17 hrs. This is likely because of time being larger than the half-life time of AIBN. Table 10 summarizes the SEC data.

TABLE 10

| Sample ID | Reaction Time (hrs) | Conv. (%) | $M_n$ (kg/mol) | $M_w/M_n$ | $\eta_w$ (mL/g) | $R_{h,z}$ (nm) |
|---|---|---|---|---|---|---|
| 37 | 17 | 10.0 | 5.5 | 1.61 | 9.0 | 2.9 |
| 38 | 24 | 10.6 | 5.1 | 1.55 | 9.1 | 2.4 |
| 39 | 51 | 13.2 | 4.1 | 1.24 | 11.9 | 2.3 |
| 40 | 75 | 10.0 | 3.7 | 1.21 | 11.1 | 2.1 |

Example 16

Synthesis of Arborescent poly(styrene-b-tert-butyl acrylate)

Figure 15:
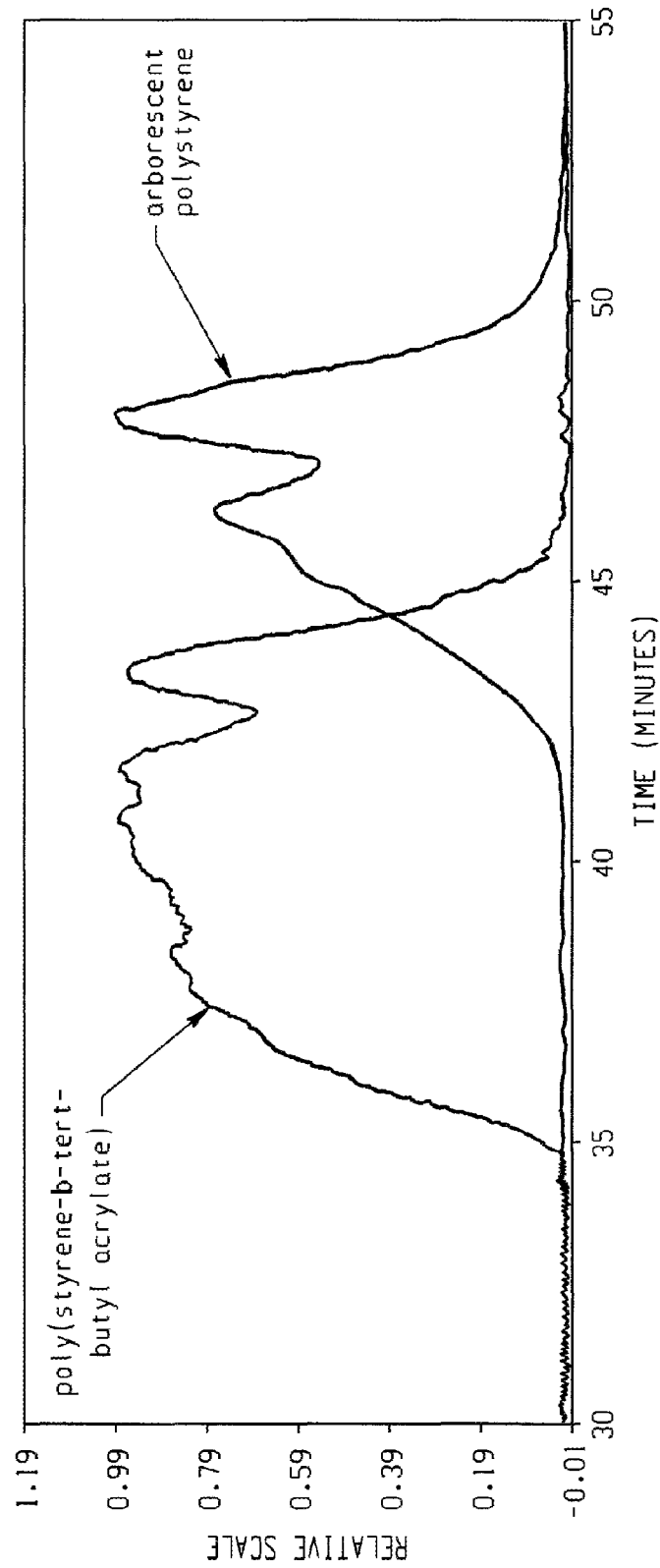
FIG. 15 shows overlaid SEC refractive index traces for arborescent polystyrene and arborescent poly(styrene-b-tert-butyl acrylate) (Example 16)
Figure 16:
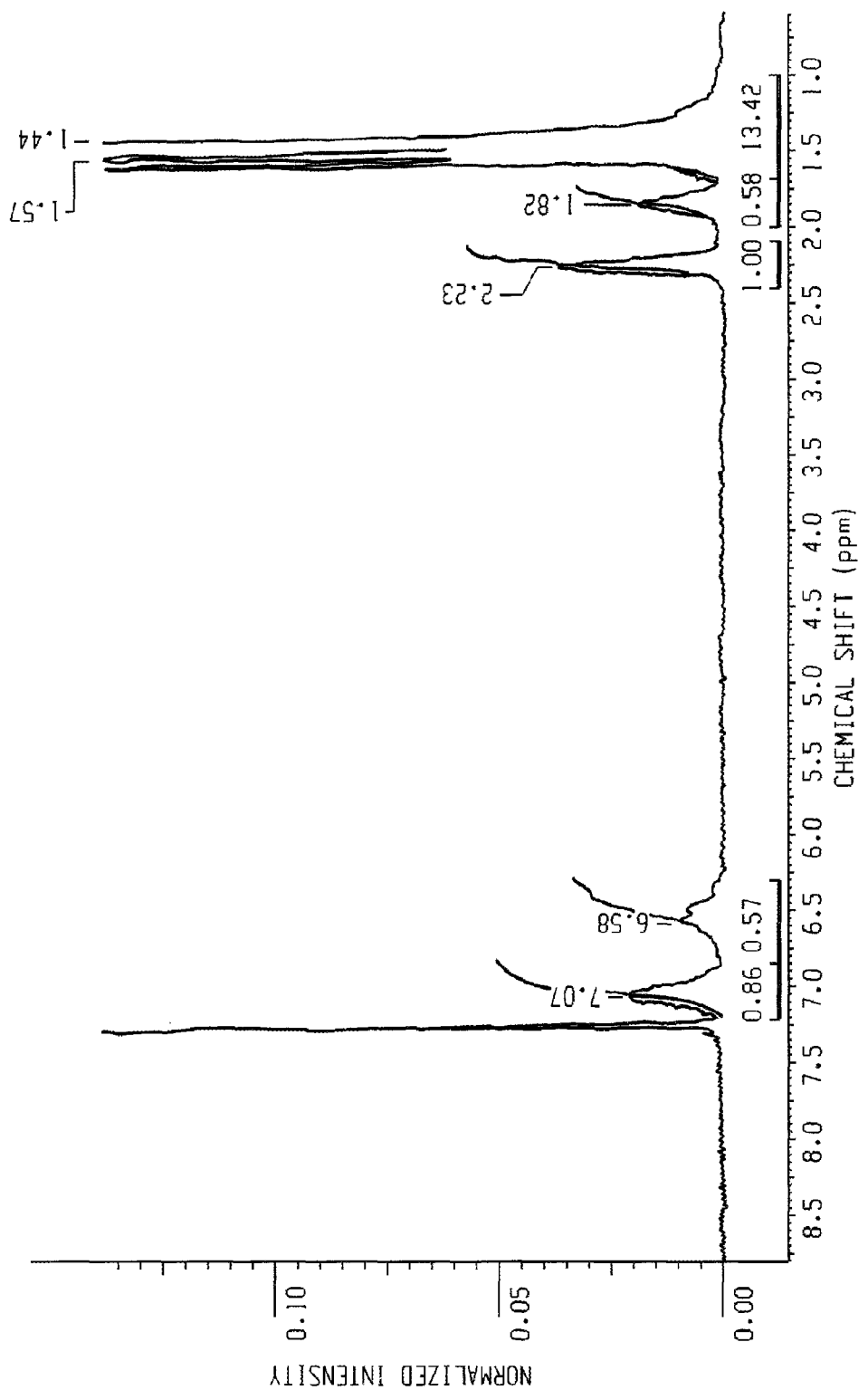
FIG. 16 shows the $^1$H NMR spectrum of arborescent poly (styrene-b-tert-butyl acrylate) in CDCl$_3$ (Example 16).

Chain extension studies were performed to prepare arborescent block copolymers. Arborescent polystyrene (0.5 g, 0.054 mmol, molar mass=20.7 kg/mol, $M_w/M_n$=1.6) as a macroinimer, tert-butyl acrylate as a second monomer (10 g, 78 mmol) and AIBN (0.0027 mmol, 0.0005 g) as an initiator were placed in a 50 mL round bottomed flask and stirred for 5 min. The flask was purged using argon for 45 min and immersed in an oil bath at 70° C. The reaction was allowed to proceed for 2.5 hrs. The final solution was precipitated in 2 L of 70/30 V/V mixture of methanol/water. The final polymer (2.7 g) was dried in a vacuum oven. Increase in the molar mass from 20.7 to 165.0 kg/mol was observed by SEC analysis (FIG. 15). The $^1$H NMR is shown in FIG. 16. Aromatic protons from the styrene are observed between 6.25 and 7.25 ppm. The aliphatic protons from styrene and aliphatic protons from tert-butyl acrylate are overlapped between 1.1 and 2.4 ppm. Thermal decomposition of the block copolymers of Examples 14 and 15 yielded poly(acrylic acid-b-styrene) and poly(styrene-b-acrylic acid) blocks, using a procedure similar to that in Example 13.

Example 17

Inimer-Type RAFT Copolymerization of 4-vinylbenzyldithiobenzoate (VBThB) with Styrene in n-Butyl Acetate (Molar Ratio of Monomer:Inimer=520:1)

4-vinylbenzyldithiobenzoate (1.82 g, 0.0048 mol/L) was copolymerized with styrene (36.4 g, 2.49 mol/L) in n-butyl acetate (100 mL). Aliquots (Sample IDs 41-47) were taken and the reaction was continued for 24 hours. The conversions of the aliquots and final product (32%) (Sample IDs 41-47) were determined gravimetrically. The resulting materials were found to have retained the pink color from the incorporation of VBThB and were completely soluble in THF demonstrating no gel fraction. Table 11 summarizes the data. The semilogarithmic rate plot and $M_n$ versus conversion plot for this polymerization obtained using data from Table 11 are both linear, indicating suppression of termination and chain transfer events.

TABLE 11

| Sample ID | Conv. (%) | Time (min) | $M_n$ (kg/mol) | $M_w$ (kg/mol) | $M_w/M_n$ | $\eta_w$ (mL/g) | $R_{h,z}$ (nm) | g' |
|---|---|---|---|---|---|---|---|---|
| 41 | 0 | 65 | — | — | — | — | — | — |
| 42 | 4 | 160 | 4.3 | 6.6 | 1.52 | 4.3 | 2.0 | 0.73 |
| 43 | 8 | 263 | 5.6 | 6.3 | 1.12 | 5.7 | 1.9 | 0.98 |
| 44 | 14 | 424 | 8.1 | 9.4 | 1.16 | 7.2 | 2.3 | 0.92 |
| 45 | 22 | 755 | 12.0 | 15.2 | 1.26 | 10.0 | 3.3 | 0.99 |
| 46 | 29 | 1257 | 14.6 | 19.0 | 1.30 | 11.0 | 3.5 | 0.88 |
| 47 | 32 | 1440 | 16.6 | 20.9 | 1.26 | 11.4 | 3.7 | 0.86 |

The invention has been described with reference to the preferred embodiments. Obviously, modifications, and alterations will occur to others upon reading and understanding the preceding detailed description. It is intended that the invention be construed as including all such modifications and alterations.

The invention claimed is:

1. A method of forming a randomly branched polymer comprising:

combining a polymerizable monomer with a dithioester chain transfer agent having the general structure represented by Structure 1:

Structure 1

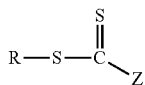

wherein R is a free-radical forming leaving group capable of initiating free radical polymerization of the monomer, wherein the R group includes a polymerizable double bond capable of forming a branching point of the polymer; and Z is a stabilizing group which stabilizes a radical formed from a dithioester part of the dithioester chain transfer agent.

2. The method of claim 1, wherein fewer branches of the randomly branched polymer are formed through a dithioester radical than through the free radical formed from R.

3. The method of claim 1, wherein the free radical formed from R lacks a sulfur-containing group.

4. The method of claim 1, wherein the free-radical formed from leaving group R comprises a polymerizable group.

5. The method of claim 1, wherein the stabilizing group has a reactivity which is comparable to that of the monomer.

6. The method of claim 1, wherein Z has any of the structures represented by Structures 11, 12, 13, 14, 15, 16, 17, 18, 19, 20, 21, 22, 23, 24, 25, 26, 27, 28, and 29, and combinations thereof:

11

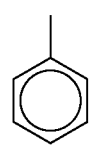

12

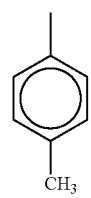

13

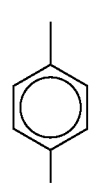

14

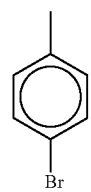

15

16

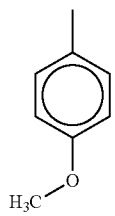

17

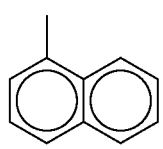

18

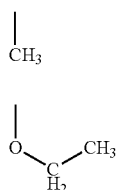

19

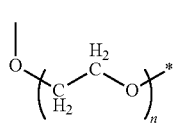

20

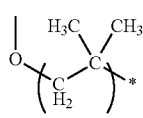

21

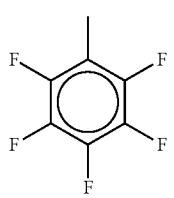

22

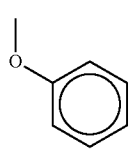

23

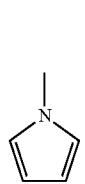

24

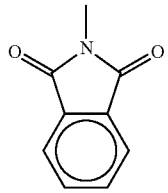

25

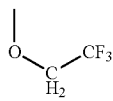

26

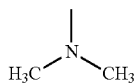

27

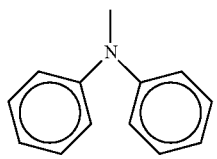

28

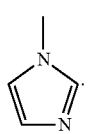

29

7. The method of claim 1, wherein R has the general structure of structure 6:

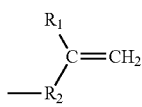

Structure 6 wherein $R_1$ is selected from the group consisting of hydrogen, alkyl, aryl, alkoxy, aryloxy, carboxy, acyloxy, aroyloxy, alkoxy-carbonyl, aryloxy-carbonyl, $CO_2H$, CN, $CONH_2$, halogen, and substituted derivatives thereof and $R_2$ is selected from the group consisting of alkyl, aryl, alkoxy, aryloxy, carboxy, acyloxy, aroyloxy, alkoxy-carbonyl, aryloxy-carbonyl, $CO_2H$, CN, $CONH_2$, and substituted derivatives thereof.

8. The method of claim 1, wherein R comprises any of the structures represented by Structures 7, 8, 9, and 10, and combinations thereof:

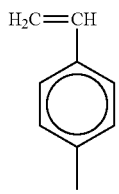

Structure 7

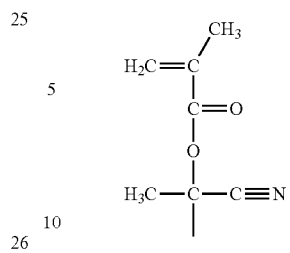

Structure 8

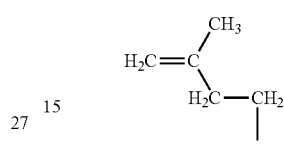

Structure 9

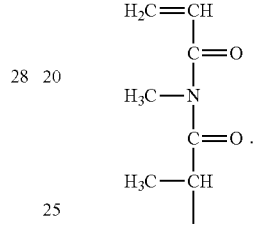

Structure 10

9. The method of claim 1, wherein the dithioester chain transfer agent comprises 4-vinylbenzyldithiobenzoate.

10. The method of claim 1, wherein the polymerizable monomer is selected from alpha-beta unsaturated aromatic and aliphatic monomers and combinations thereof.

11. The method of claim 10, wherein the polymerizable monomer is selected from the group consisting of styrene, p-chloro styrene, p-methyl styrene, p-bromo styrene, isoprene, butadiene, methyl methacrylate, N,N dimethyl acrylamide, acrylamide, hydroxyethyl methacrylate, acrylic acid, vinyl acetate, terf-butyl acrylate, n-butyl acrylate, methyl acrylate, methacrylonitrile, acrylonitrile, N-isopropyl acrylamide, dimethyl amino methacrylate N-vinylcarbazole, N-vinylpyrrolidone, vinylpyridine, vinylimidazole, vinyl chloride, and combinations thereof.

12. The method of claim 11, wherein the monomer comprises styrene.

13. The method of claim 12, wherein the Z group comprises methyl benzene.

14. The method of claim 1, wherein the polymerizing is carried out in a one-pot synthesis.

15. The method of claim 1, wherein the polymerizing is carried out in the presence of an initiator.

16. The method of claim 15, wherein the initiator is selected from the group consisting of azobis(isobutyronitrile), 4,4'-azobis(4-cyanovaleric acid), 2,2'-azobis(2-methylpropanenitrile), 2,2'-azobis(2-methylbutanenitrile), 1,1'-azobis(1-cyclohexanenitrile), azo-f-butane, dicumyl hyponitrile, f-butyl peroxide, dilauroyl peroxide, succinic acid peroxide, dibenzoyl peroxide, di-f-butyl peroxyoxalate, 2,2'-azobis(2-methylbutanenitrile), azoisooctane, dibutyl hyponitrile, dicumyl hyponitrile dicumyl peroxide, potassium persulfate, didodecanenoyl peroxide, and combinations thereof.

17. The method of claim 1, further comprising, after the polymerizing, cleaving dithioester moieties from terminal ends of branches of the polymer.

18. The method of claim 17, wherein the cleaving includes addition of a further charge of a monomer optionally in the presence of a free radical initiator.

19. The method of claim 17, wherein the cleaving includes addition of a compound yielding a suitable functional group to form at least one of a block copolymer and a functionalized monomer.

20. The method of claim 19, wherein the block copolymer has thermoplastic elastomeric properties.

21. The method of claim 19, wherein the block copolymer product is amphiphilic.

22. The method of claim 1, further comprising copolymerizing the randomly branched polymer with a polymerizable second monomer, different from the first polymerizable monomer, optionally in the presence of an initiator, to form a randomly branched block copolymer.

23. The method of claim 22, wherein the polymerizable second monomer is selected from alpha-beta unsaturated aromatic and aliphatic monomers and combinations thereof.

24. The method of claim 1, wherein the monomer and dithioester chain transfer agent are present at a molar ratio of at least 2:1.

25. The method of claim 24, wherein the molar ratio is at least 50:1.

26. The method of claim 25, wherein the molar ratio is at least 200:1.

27. The method of claim 24, wherein the molar ratio is up to 1500:1.

28. The method of claim 27, wherein the molar ratio is up to 1200:1.

29. A randomly branched polymer formed by the method of claim 1.

\* \* \* \* \*